US012769194B2

(12) United States Patent
Matsumiya et al.

(10) Patent No.: US 12,769,194 B2
(45) Date of Patent: Oct. 20, 2026

(54) PROJECTOR

(71) Applicant: SEIKO EPSON CORPORATION, Tokyo (JP)

(72) Inventors: Toshio Matsumiya, Matsumoto (JP); Keita Tsukioka, Matsumoto (JP); Nobuyuki Otsuki, Matsumoto (JP)

(73) Assignee: SEIKO ESPON CORPORATION, Tokyo (JP)

( * ) Notice: Subject to any disclaimer, the term of this patent is extended or adjusted under 35 U.S.C. 154(b) by 309 days.

(21) Appl. No.: 18/680,186

(22) Filed: May 31, 2024

(65) Prior Publication Data

US 2024/0402584 A1 Dec. 5, 2024

(30) Foreign Application Priority Data

May 31, 2023 (JP) ................................ 2023-090342

(51) Int. Cl.
*G03B 21/16* (2006.01)

(52) U.S. Cl.
CPC .................................... *G03B 21/16* (2013.01)

(58) Field of Classification Search
CPC ..... G03B 21/16; G03B 21/145; H04N 9/3144
USPC ........................................................... 353/57
See application file for complete search history.

(56) References Cited

U.S. PATENT DOCUMENTS

2008/0055561 A1* 3/2008 Lv .......................... G03B 21/16 353/57
2008/0094581 A1* 4/2008 Nakagawa ............. G03B 21/16 353/58
2008/0094582 A1* 4/2008 Nakagawa ............. G03B 21/16 353/61
2011/0032490 A1* 2/2011 Hsiao ..................... G03B 21/16 353/58
2020/0301265 A1* 9/2020 Yan .................... G03B 21/2033
2020/0401027 A1* 12/2020 Zhao .................. G03B 21/2033
2021/0203892 A1 7/2021 Okoshi et al.

FOREIGN PATENT DOCUMENTS

JP H10-325982 A 12/1998
JP 2013-041134 A 2/2013
JP 2021-103220 A 7/2021

* cited by examiner

*Primary Examiner* — Magda Cruz
(74) *Attorney, Agent, or Firm* — Dority & Manning, P.A.

(57) ABSTRACT

A projector includes an exterior housing having a discharge port, a first cooling target including a plurality of fins, a second cooling target, a first cooling fan that sends cooling air to the first and second cooling targets, and a second cooling fan that creates a positive pressure in the exterior housing. The second cooling target is disposed at a position where the positive pressure is created inside the exterior housing. The cooling air from the first cooling fan flows to the discharge port with the aid of the delivery force produced by the first cooling fan, and the cooling air flowing from the first cooling fan to the second cooling target flows to the discharge port with the positive pressure in the exterior housing acting on the cooling air.

13 Claims, 15 Drawing Sheets

PROJECTOR

The present application is based on, and claims priority from JP Application Serial Number 2023-090342, filed May 31, 2023, the disclosure of which is hereby incorporated by reference herein in its entirety.

BACKGROUND

1. Technical Field

The present disclosure relates to a projector.

2. Related Art

In related art, there is a known projector that forms image light from the light output from a light source apparatus and projects the formed image light (see JP-A-10-325982 and JP-A-2021-103220, for example).

The projector described in JP-A-10-325982 includes a lamp unit, a polarizing plate unit, an LCD unit, a lens unit, a power supply block, and two blower fans. Out of the two blower fans, the blower fan disposed in a rear portion of the projector sucks the outside air via the lower front side of the projector to cause an airflow to the power supply block. Out of the two blower fans, the blower fan disposed in the vicinity of the polarizing plate unit and the LCD unit blows outside air sucked via the exterior intake port to the polarizing plate unit and the LCD unit. The airflow having flowed through the polarizing plate unit and the LCD unit flows to the lamp unit, and is discharged along with the outside air having flowed to the power supply block by a blower fan disposed in the rear portion of the projector.

The projector described in JP-A-2021-103220 includes a first fan and a second fan. The first fan sucks the air outside the exterior housing via first introduction ports provided at the bottom surface of the projector, and the air sent from the first fan is split and caused to flow to each of the power supply apparatus and the signal processing apparatus. The second fan sucks the air having flowed through the power supply apparatus and the signal processing apparatus, and sends the sucked air to the airflow rectifier. The air having flowed through the airflow rectifier is discharged out of the exterior housing via the discharge ports.

JP-A-10-325982 and JP-A-2021-103220 are examples of the related art.

In the projector described in JP-A-10-325982, however, the cooling gas sent from one of the fans flows through the LCD unit and the polarizing plate unit, and then further flows to the lamp unit. The temperature of the cooling gas sent from the one fan therefore rises whenever the cooling gas flows through a cooling target, so that there is a problem of a decrease in the efficiency at which the cooling target disposed downstream in the flow path of the cooling gas is cooled.

Also in the projector described in JP-A-2021-103220, in which the cooling gas having cooled the power supply apparatus and the signal processing apparatus flows to the airflow rectifier, there is a problem of a decrease in the efficiency at which the cooling target disposed downstream in the flow path of the cooling gas is cooled, as in the projector described in JP-A-10-325982.

In view of the facts described above, there has been a demand for a projector capable of efficiently cooling a plurality of cooling targets and quickly discharging heat in the housing.

SUMMARY

A projector according to a first aspect of the present disclosure includes an exterior housing having a discharge port having a plurality of openings, a first cooling target including a plurality of fins, a second cooling target, a first cooling fan that sucks air outside the exterior housing and sends the sucked outside air as first cooling air to each of the first cooling target and the second cooling target, and a second cooling fan that sucks the air outside the exterior housing and sends the sucked outside air as second cooling air into the exterior housing to create a positive pressure in the exterior housing. The plurality of fins constitute part of a flow path through which the first cooling air flows between the plurality of fins. At least one of the plurality of openings is disposed at a position where the one opening opposes the plurality of fins at a position downstream from the plurality of fins in the flow path through which the first cooling air flows. The second cooling target is disposed at a position where the positive pressure is created inside the exterior housing. The first cooling air sent from the first cooling fan and flowing between the plurality of fins flows to the at least one opening with the aid of a delivery force produced by the first cooling fan. The first cooling air sent from the first cooling fan and flowing to the second cooling target flows to one of the plurality of openings with the positive pressure in the exterior housing acting on the first cooling air.

A projector according to a second aspect of the present disclosure includes an exterior housing having a first surface having a first discharge port and a second surface having a second discharge port, a first cooling target including a plurality of fins, a second cooling target, a first cooling fan that sucks air outside the exterior housing and sends the sucked outside air as first cooling air to each of the first cooling target and the second cooling target, and a second cooling fan that sucks the air outside the exterior housing, and sends the sucked outside air as second cooling air into the exterior housing to create a positive pressure in the exterior housing. The plurality of fins constitute part of a flow path through which the first cooling air flows between the plurality of fins. The first discharge port is disposed at a position where the first discharge port opposes the plurality of fins at a position downstream from the plurality of fins in the flow path through which the first cooling air flows. The second cooling target is disposed at a position where the positive pressure is created inside the exterior housing. The first cooling air sent from the first cooling fan and flowing between the plurality of fins flows to the first discharge port with the aid of a delivery force produced by the first cooling fan. The first cooling air sent from the first cooling fan and flowing to the second cooling target flows to the second discharge port with the positive pressure in the exterior housing acting on the first cooling air.

DESCRIPTION OF EMBODIMENTS

An embodiment of the present disclosure will be described below with reference to the drawings.

Configuration of Projector

Figure 1:
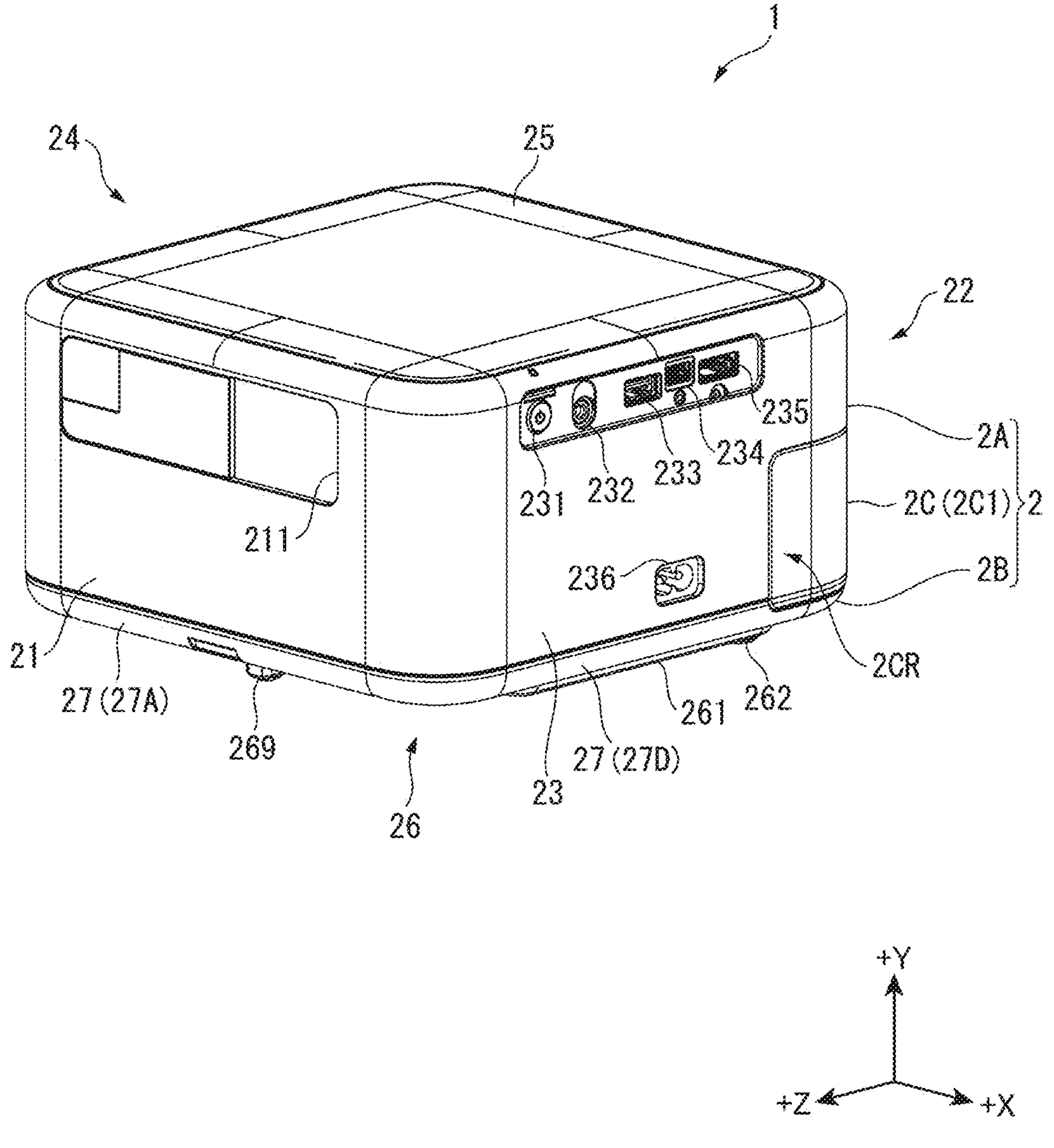
FIG. 1 is a perspective view showing a projector according to an embodiment.
Figure 2:
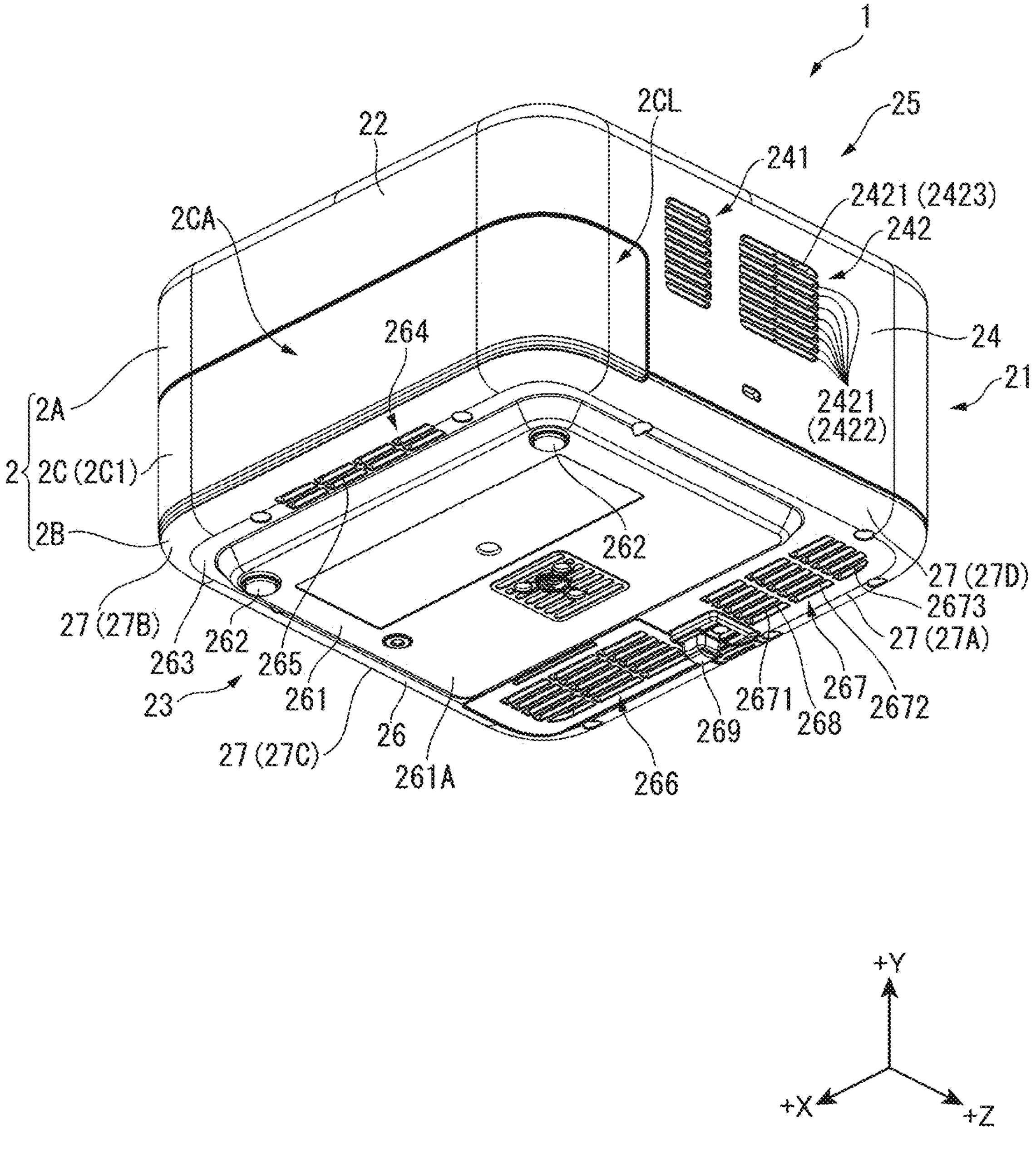
FIG. 2 is a perspective view showing the projector according to the embodiment.

FIGS. 1 and 2 are perspective views showing a projector 1 according to the present embodiment. In detail, FIG. 1 is a perspective view showing the projector 1 viewed from the upper front side, and FIG. 2 is a perspective view showing the projector 1 viewed from the lower rear side.

The projector 1 according present embodiment projects image light according to image information onto a projection receiving surface. The projector 1 includes an exterior housing 2, as shown in FIGS. 1 and 2.

In the following description, three directions perpendicular to one another are called X, Y, and Z directions toward the positive ends thereof. The positive Y direction is the direction that vertically extends upward from an installation surface at which the projector 1 is installed. When the projector 1 is viewed from the side facing the positive Y direction, the positive Z direction is the direction in which the projector 1 projects the image light.

Although not shown, the opposite direction of the positive X direction is called a negative X direction, the opposite direction of a positive Y direction is called a negative Y direction, and the opposite direction of the positive Z direction is called a negative Z direction. Although not shown, an axis along the positive X direction is called an X-axis, an axis along the positive Y direction is called a Y-axis, and an axis along the positive Z direction is called a Z-axis.

Configuration of Exterior Housing

The exterior housing 2 is a housing that constitutes the exterior of the projector 1, as shown in FIGS. 1 and 2. The exterior housing 2 includes an upper case 2A, which constitutes a portion facing the positive Y direction, a lower case 2B, which constitutes a portion facing the negative Y direction, and a fabric unit 2C, which constitutes a portion facing the negative Z direction, a portion facing the positive X direction, a portion facing the negative X direction. The exterior housing 2 is formed in a substantially rectangular-box-like shape that is the combination of the upper case 2A, the lower case 2B, and the fabric unit 2C. The exterior housing 2 has a front surface 21, a rear surface 22, a right side surface 23, a left side surface 24, a top surface 25, a bottom surface 26, and an inclining surface 27.

The front surface 21 is formed by a portion of the upper case 2A that faces the negative Y direction and a portion of the lower case 2B that faces the positive Y direction. The rear surface 22, the right side surface 23, and the left side surface 24 are each formed by a portion of the upper case 2A that faces the negative Y direction, a portion of the lower case 2B that faces the positive Y direction, and the fabric unit 2C. The top surface 25 is formed by the upper case 2A, and the bottom surface 26 is formed by the lower case 2B.

Configuration of Front and Rear

The front surface 21 shown in FIG. 1 and the rear surface 22 shown in FIG. 2 are surfaces opposite from each other along the Z-axis.

The front surface 21 is a side surface of the exterior housing 2 that faces the positive Z direction, and is continuous with the bottom surface 26, as shown in FIG. 1. The front surface 21 is provided with a projection port 211, via which the image light to be projected onto the projection receiving surface passes.

The rear surface 22 is a side surface of the exterior housing 2 that faces the negative Z direction, as shown in FIG. 2. The portion of the rear surface 22 that faces the negative Y direction is formed by the fabric unit 2C, which covers a speaker unit 8, which will be described later, from the side facing the negative Z direction.

Configurations of Right Side Surface and Left Side Surface

The right side surface 23 shown in FIG. 1 and the left side surface 24 shown in FIG. 2 are surfaces opposite from each other along the X-axis.

The right side surface 23 is a side surface of the exterior housing 2 that faces the positive X direction, as shown in FIG. 1. A power button 231, connection terminals 232 to 235, and an inlet 236 are provided at the right side surface 23.

The left side surface 24 is a side surface of the exterior housing 2 that faces the negative X direction, as shown in FIG. 2. The left side surface 24 is provided with discharge ports 241 and 242, via which a cooling gas having flowed through the interior of the exterior housing 2 is discharged.

The discharge ports 241 are discharge ports via which cooling air having flowed through a wireless communication apparatus 4 and a second heat dissipation member 317, which will be described later, is discharged.

The discharge ports 242 are provided at positions shifted from the discharge ports 241 toward the positive Z direction. The discharge ports 242 have configuration in which a plurality of substantially rectangular openings 2421 elongated in the Z-axis are provided along the Y-axis. That is, the discharge ports 242 are formed of the plurality of openings 2421.

Out of the plurality of openings 2421, at least one opening 2421 is a first opening 2422, via which the cooling gas having cooled a first heat dissipation member 312, which will be described later, is discharged, and at least another opening 2421 is a second opening 2423, via which the cooling gas having cooled a control substrate 7 including a light source drive circuit 72, which will be described later, is discharged.

In the present embodiment, the first opening 2422 is an opening shifted toward the negative Y direction from an end of a duct member 57, which will be described later, the end facing the discharge ports 242, and the second opening 2423 is an opening shifted toward the positive Y direction from the end of the duct member 57 that faces the discharge ports 242. The second opening 2423 is one of the plurality of openings 2421 that is disposed at a position closest to the positive Y direction, and the first opening 2422 is an opening 2421 that is not the second opening 2423 out of the plurality of openings 2421. The first opening 2422 and the second opening 2423 are thus arranged adjacent to each other.

The flow of the cooling air discharged out of the exterior housing 2 via the discharge ports 242 will be described later in detail.

Configuration of Fabric Unit

Figure 3:
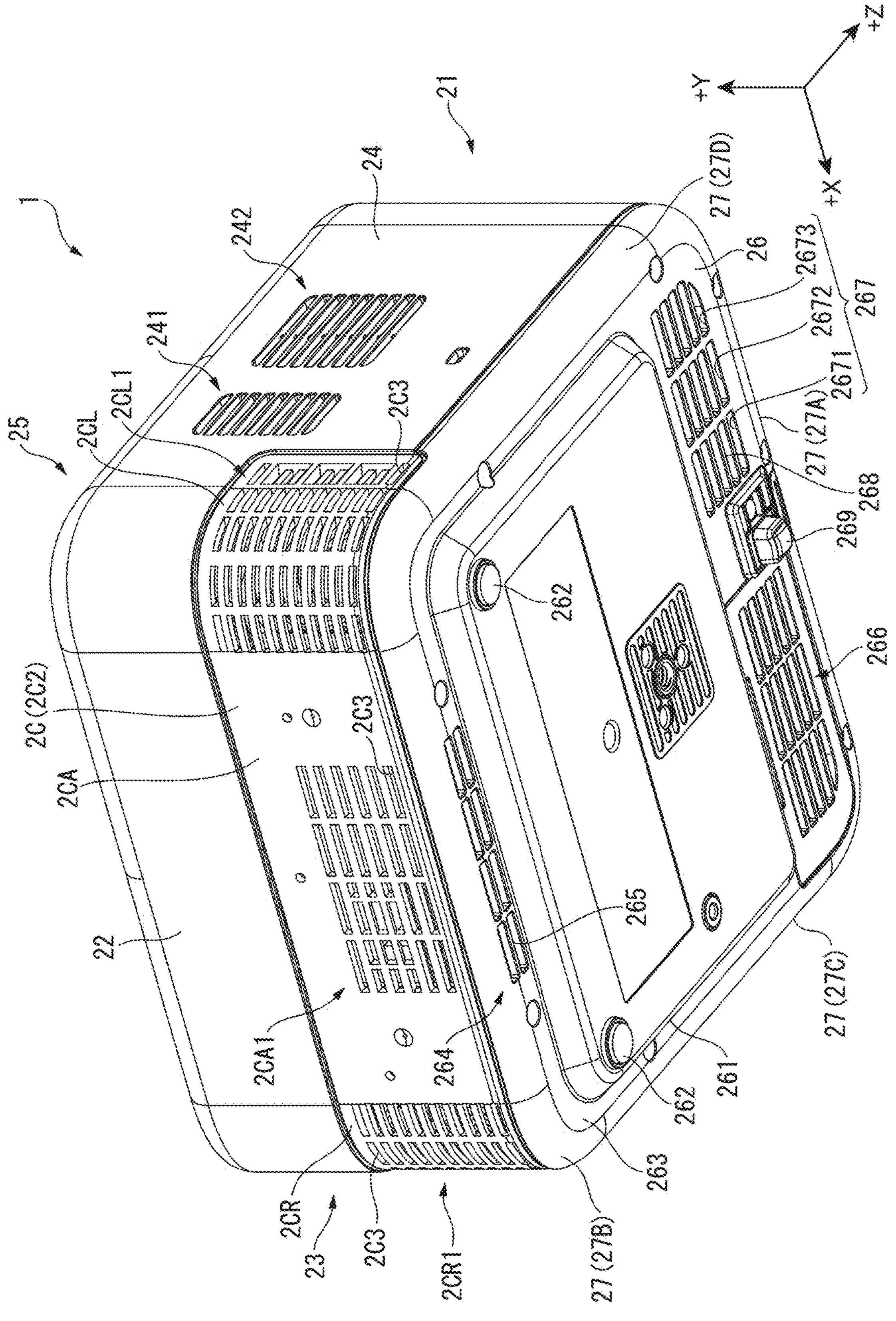
FIG. 3 is a perspective view showing the projector according to the embodiment with a fabric omitted.

FIG. 3 is a perspective view of the projector 1 viewed from the side facing the negative Z direction with a fabric 2C1, which constitutes the fabric unit 2C, omitted. In FIG. 3, reference characters are given only to some of a plurality opening sections 2C3, which constitute communication ports 2CA1, right sound emission ports 2CR1, and left sound emission ports 2CL1.

The fabric unit 2C is disposed so as to extend across the rear surface 22 and to part of the right side surface 23 and the left side surface 24, as shown in FIGS. 1 and 2.

The fabric unit 2C includes the fabric 2C1, as shown in FIGS. 1 and 2, and further includes a frame 2C2, which supports the fabric 2C1, as shown in FIG. 3.

The fabric 2C1 is provided at the outer surface of the frame 2C2 to cover the frame 2C2.

The frame 2C2 is formed in a substantially U shape when viewed from the side facing the positive Y direction, as shown in FIG. 3. The frame 2C2 includes a rear surface section 2CA, which constitutes a portion of the rear surface 22 that faces the negative Y direction, a right side surface section 2CR, which constitutes a portion of the right side surface 23 that faces the negative ends of the Y and Z directions, and a left side surface section 2CL, which constitutes a portion of the left side surface 24 that faces the negative ends of the Y and Z directions.

The rear surface section 2CA has the communication ports 2CA1, which cause the interior and the exterior of the exterior housing 2 to communicate with each other.

The communication ports 2CA1 are formed of the plurality of opening sections 2C3 arranged horizontally and vertically, and each of the opening sections is a sound emission port of a first sound emitter 82, which will be described later, and is also an introduction port via which the air outside the exterior housing 2 is introduced as the cooling gas into the exterior housing 2.

The right side surface section 2CR has the right sound emission ports 2CR1, which serve as sound emission ports of a second sound emitter 83, which will be described later.

The left side surface section 2CL has the left sound emission ports 2CL1, which serve as sound emission ports of a second sound emitter 84, which will be described later.

Configurations of Top Surface and Bottom Surface

The top surface 25 shown in FIG. 1 and the bottom surface 26 shown in FIG. 2 are surfaces opposite from each other along the Y-axis. The bottom surface 26 is a wall that is continuous with the rear surface 22 and intersects with the rear surface 22, and corresponds to a second wall.

The top surface 25 is a surface of the exterior housing 2 that faces the positive Y direction, as shown in FIG. 1.

The bottom surface 26 is a surface of the exterior housing 2 that faces the negative Y direction, as shown in FIG. 2. In other words, the bottom surface 26 is an opposing surface that opposes the installation surface at which the projector 1 is placed, and is a portion of the exterior housing 2 that is visible from the side facing the negative Y direction.

The bottom surface 26 has a protrusion 261 and a step 263.

The protrusion 261 is a portion protruding toward the negative Y direction and located substantially at the center of the bottom surface 26, and is formed in a substantially rectangular shape when viewed from the side facing the negative Y direction. The protrusion 261 is provided with fixed legs 262.

The fixed legs 262 are provided at two corners of the protrusion 261 that face the negative Z direction. The fixed legs 262 form one of contact portions in contact with the installation surface.

The step 263 is a portion of the bottom surface 26 that is not the protrusion 261, and is a noncontact portion that does not into contact with the come installation surface. Specifically, the step 263 is disposed at a position shifted toward the positive Y direction from a surface 261A of the protrusion 261, at which the fixed legs 262 are provided, and is separate from the installation surface toward the positive Y direction when the projector 1 is installed at the installation surface.

The step 263 is provided with first intake ports 264, meshes 265 and 268, second intake ports 266, third intake ports 267, and an adjustable leg 269. That is, the exterior housing 2 has the intake ports 264, 266, and 267.

The first intake ports 264 are disposed at positions shifted from the protrusion 261 toward the negative Z direction. That is, the first intake ports 264 are provided at positions on the bottom surface 26 that are shifted toward the rear surface 22. The first intake ports 264 introduce the air outside the exterior housing 2 as the cooling gas into the exterior housing 2 with the aid of a first fan 51 of a cooling apparatus 5, which will be described later.

The mesh 265 is provided inside the exterior housing 2 in correspondence with the first intake ports 264, and captures dirt and dust contained in the outside air flowing through the first intake ports 264.

The second intake ports 266 are disposed at a portion of the bottom surface 26 that is shifted toward the positive X direction and the positive Z direction. The second intake ports 266 introduce the air outside the exterior housing 2 as the cooling gas into the exterior housing 2 with the aid of a second fan 54 of the cooling apparatus 5, which will be described later. Although not shown, a sponge-like filter is provided inside the exterior housing 2 in correspondence with the second intake ports 266. The filter collects dirt and dust contained in the outside air passing through the second intake ports 266.

The third intake ports 267 are disposed at a portion of the bottom surface 26 that is shifted toward the negative X direction and the positive Z direction. The third intake ports 267 introduce the air outside the exterior housing 2 as the cooling gas into the exterior housing 2 with the aid of a third fan 55 of the cooling apparatus 5, which will be described later. The third intake ports 267 are formed of three opening sections 2671 to 2673 arranged along the X-axis. The opening sections 2671, which are one of the three opening sections and shifted toward the positive X direction, introduce the cooling gas flowing to a power supply apparatus 9, which will be described later, with the aid of the third fan 55. Opening sections 2672 and 2673, which are two of the three opening sections and disposed at positions shifted from the openings 2671 toward the negative X direction, introduce the cooling gas directly sucked by the third fan 55.

The mesh 268 is provided inside the exterior housing 2 in correspondence with the third intake ports 267. The mesh 268 collects dirt and dust contained in the outside air passing through the third intake ports 267, as the mesh 265 does.

The adjustable leg 269 is provided at a position sandwiched between the second intake ports 266 and the third intake ports 267 on the X-axis. The adjustable leg 269 is a leg capable of adjusting the amount of protrusion from the bottom surface 26, and is one of the contact portions that come into contact with the installation surface.

Configuration of Inclining Surface

The inclining surface 27 is provided as part of the lower case 2B so as to extend along the front surface 21, the rear surface 22, the right side surface 23, the left side surface 24, and the bottom surface 26. The inclining surface 27 includes a front inclining surface 27A, a rear inclining surface 27B, a right inclining surface 27C, and a left inclining surface 27D.

The front inclining surface 27A is formed of a portion of the front surface 21 that is shifted toward the negative Y direction and a portion of the bottom surface 26 that is shifted toward the positive Y direction. The front inclining surface 27A is a surface that extends along the front surface 21 and the bottom surface 26 and approaches the installation surface as extending toward the rear surface 22, which is opposite from the front surface 21. That is, a portion of the front inclining surface 27A that is shifted toward the negative Y direction inclines with respect to the front surface 21, and a portion of the front inclining surface 27A that is shifted toward the positive Y direction inclines with respect to the bottom surface 26.

The rear inclining surface 27B is formed of a portion of the rear surface 22 that is shifted toward the negative Y direction and a portion of the bottom surface 26 that is shifted toward the positive Y direction.

The right inclining surface 27C is formed of a portion of the right side surface 23 that is shifted toward the negative Y direction and a portion of the bottom surface 26 that is shifted toward the positive Y direction. The left inclining surface 27D is formed of a portion of the left side surface 24 that is shifted toward the negative Y direction and a portion of the bottom surface 26 that is shifted toward the positive Y direction.

The rear inclining surface 27B, the right inclining surface 27C, and the left inclining surface 27D each incline as the front inclining surface 27A does.

Configuration of Upper Portion of Projector

Figure 4:
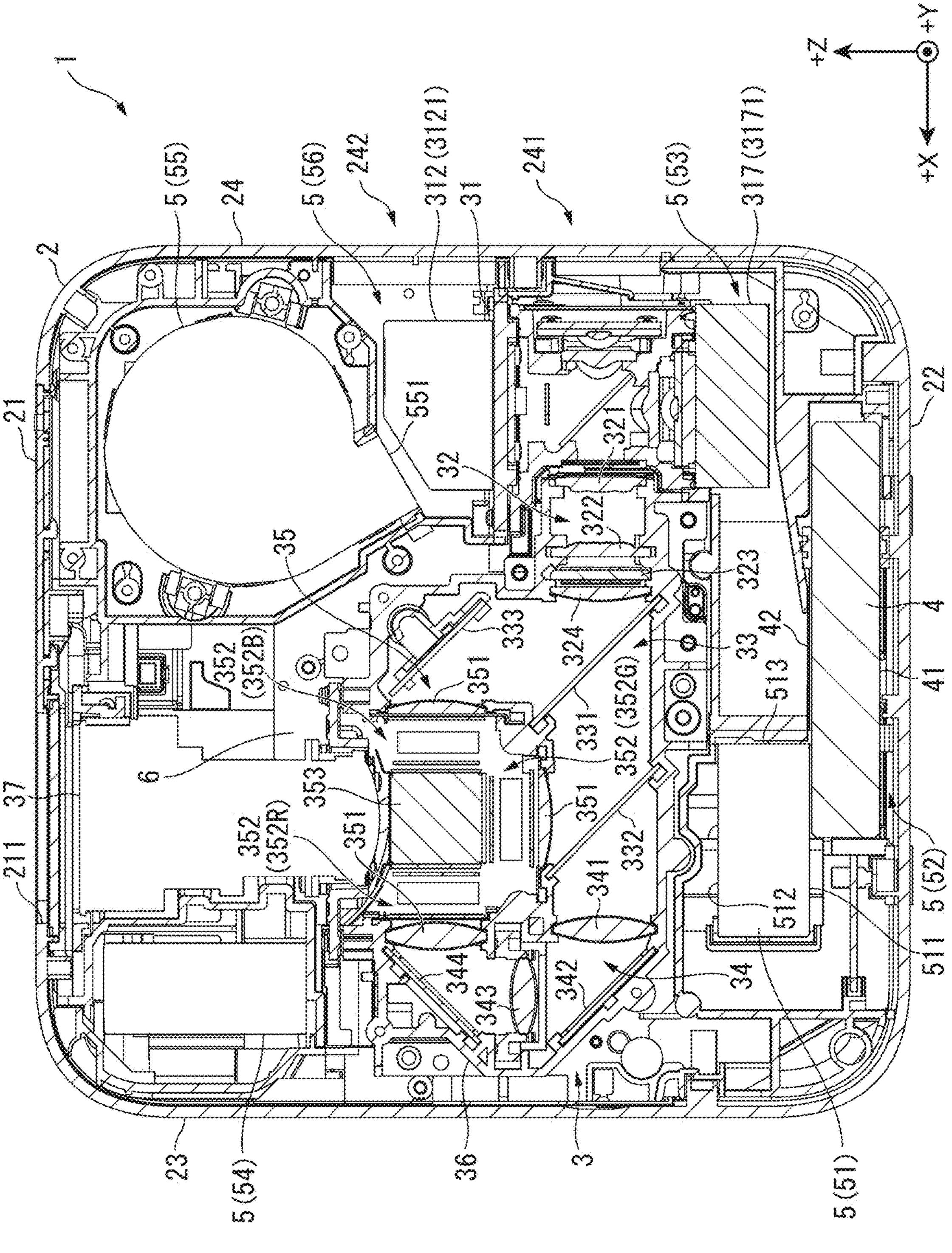
FIG. 4 is a cross-sectional view showing the projector according to the embodiment.

FIG. 4 shows a cross section of the projector 1 taken along an XZ plane.

The projector 1 includes, in addition to the exterior housing 2, an image projection apparatus 3, the wireless communication apparatus 4, and the cooling apparatus 5, which are disposed in a portion of the exterior housing 2 that is shifted toward the positive Y direction, and further includes a base 6, which supports the image projection apparatus 3, the wireless communication apparatus 4, and the cooling apparatus 5 in the Y direction toward the negative end thereof, as shown in FIG. 4.

In addition, as will be described later in detail, the projector 1 includes a control substrate 7, which is disposed at a position shifted toward the positive Y direction from the image projection apparatus 3, the wireless communication apparatus 4, and the cooling apparatus 5, and the speaker unit 8 and the power supply apparatus 9 disposed at positions shifted from the base 6 toward the negative Y direction.

Configuration of Image Projection Apparatus

The image projection apparatus 3 generates image light according to image information and projects the generated image light. The image projection apparatus 3 is provided substantially at the center of the exterior housing 2 and along the X-axis and the Z-axis. The image projection apparatus 3 includes a light source apparatus 31, a homogenizing system 32, a color separation system 33, a relay system 34, an image formation unit 35, an optical part housing 36, and a projection optical apparatus 37.

The light source apparatus 31 is provided at a position shifted toward the negative X direction and located substantially at the center of the Z-axis in the exterior housing 2, and outputs illumination light toward the positive X direction. The configuration of the light source apparatus 31 will be described later in detail.

The homogenizing system 32 homogenizes the illumination light output from the light source apparatus 31. The homogenized illumination light travels via the color separation system 33 and the relay system 34 and illuminates a light modulation region of each light modulator 352, which will be described later. The homogenizing system 32 includes two lens arrays 321 and 322, a polarization converter 323, and a superimposing lens 324.

The color separation system 33 separates the illumination light incident from the homogenizing system 32 into red light, green light, and blue light. The color separation system 33 includes two dichroic mirrors 331 and 332 and a reflection mirror 333, which reflects the blue light separated by the dichroic mirror 331.

The relay system 34 is provided in the optical path of the red light, which is longer than the optical paths of the other color light, and suppresses loss of the red light. The relay system 34 includes a light-incident-side lens 341, a relay lens 343, reflection mirrors 342 and 344. Note that the blue light may be set as the color light having a longer optical path than those of the other color light, and the relay system 34 may be provided in the optical path of the blue light.

The image formation unit 35 modulates the red light, the green light, and the blue light incident thereon and combines the modulated three types of color light with one another to form the image light. The image formation unit 35 includes three field lenses 351, which are provided in accordance with the incident three types of color light, three light modulators 352, which modulate the light incident thereon, and one light combiner 353. That is, the image formation unit 35 includes the optical modulators 352 and forms the image light.

The three light modulators 352 include a light modulator 352R, which modulates the red light, a light modulator 352G, which modulates the green light, and a light modulator 352B, which modulates the blue light. The light modulators 352 can be each formed, for example, of a liquid crystal panel and a pair of polarizing plates that sandwich the liquid crystal panel. The light modulators 352 are each a heat source that generates heat when light is incident thereon.

The light combiner 353 combines the three types of color light modulated by the light modulators 352B, 352G, and 352R with one another to form the image light and outputs the formed image light to the projection optical apparatus 37. In the present embodiment, the light combiner 353 is formed of a cross dichroic prism, but not necessarily, and can instead be formed, for example, of a plurality of dichroic mirrors.

The optical part housing 36 accommodates the homogenizing system 32, the color separation system 33, and the relay system 34.

The projection optical apparatus 37 is a projection lens that enlarges the image light incident from the image formation unit 35 and projects the enlarged image light onto the projection receiving surface. The projection optical apparatus 37 can, for example, be an assembled lens including a plurality of lenses and a tubular lens barrel that accommodates the plurality of lenses.

Configuration of Light Source Apparatus

Figure 5:
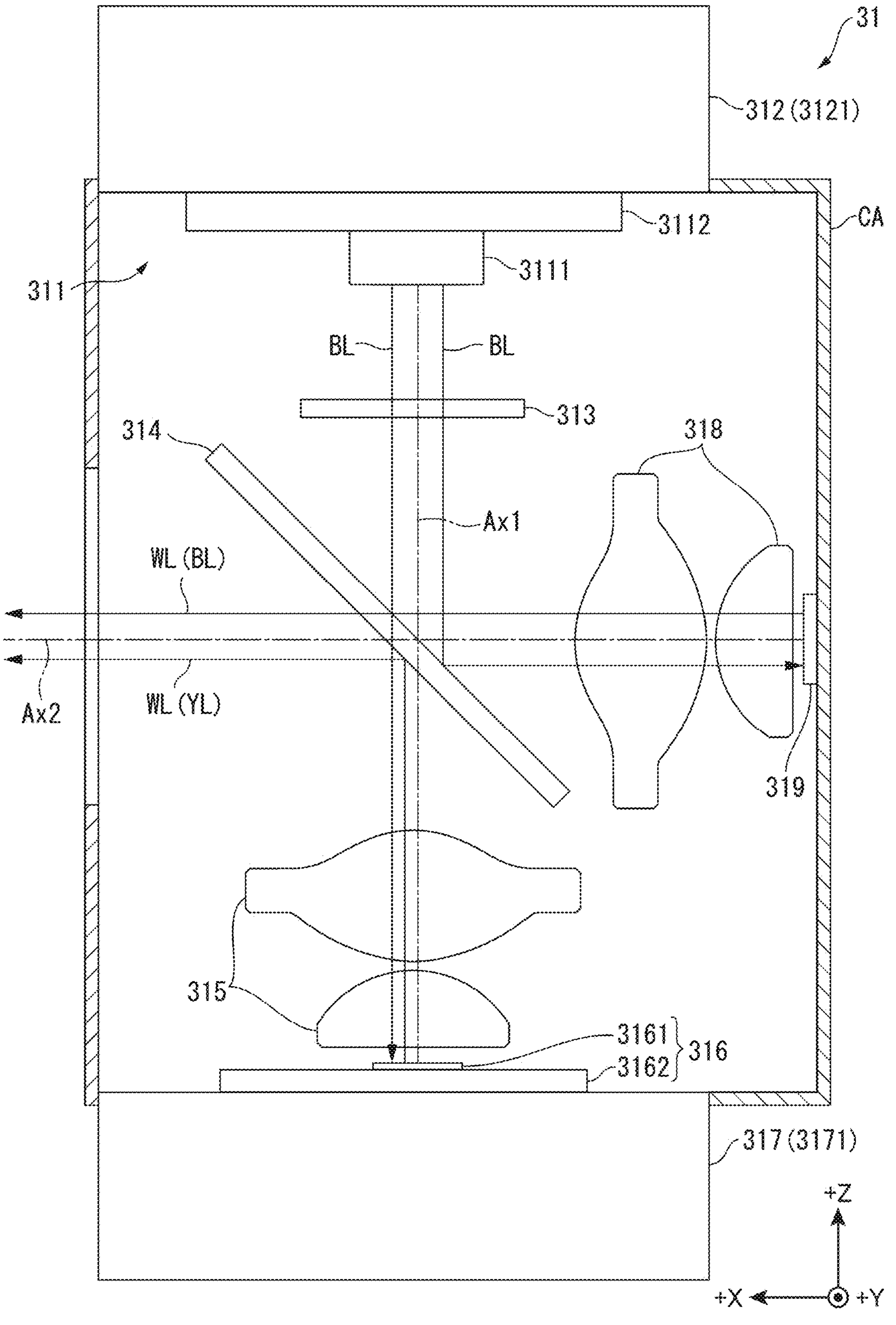
FIG. 5 is a diagrammatic view showing the configuration of a light source apparatus according to the embodiment.

FIG. 5 is a diagrammatic view showing the configuration of the light source apparatus 31.

The light source apparatus 31 outputs illumination light WL, toward the homogenizing system 32 in the X direction toward the positive end thereof. The light source apparatus 31 includes a light source 311, a first heat dissipation member 312, a diffusively transmissive section 313, a light separator 314, a first light collector 315, a wavelength converter 316, a second heat dissipation member 317, a second light collector 318, a diffusive reflector 319, and a light source housing CA, as shown in FIG. 5.

The following axes are set in the light source apparatus 31: an optical axis Ax1 extending along the Z-axis; and an optical axis Ax2 extending along the X-axis, and the optical axes Ax1 and Ax2 are perpendicular to each other. The optical parts of the light source apparatus 31 are disposed on the optical axis Ax1 or the optical axis Ax2.

Specifically, the light source 311, the diffusively transmissive section 313, the light separator 314, the first light t collector 315, and the wavelength converter 316 are disposed on the optical axis Ax1.

The diffusive reflector 319, the second light collector 318, and the light separator 314 are disposed on the optical axis Ax2. That is, the light separator 314 is disposed at the intersection of the optical axis Ax1 and the optical axis Ax2.

The optical axis Ax2 is linked to the optical axis of the image projection apparatus 3 at the lens array 321 of the homogenizing system 32.

Configuration of Light Source Housing

The light source housing CA accommodates the light source 311, the diffusively transmissive section 313, the light separator 314, the first light collector 315, the wavelength converter 316, the second light collector 318, and the diffusive reflector 319. In the present embodiment, the light source housing CA is a sealed housing that dirt and dust is unlikely to enter, but not necessarily. The light source housing CA only needs to accommodate the optical parts described above.

Configuration of Light Source

The light source 311 outputs light toward the negative Z direction. The light source 311 includes a light emitter 3111 and a substrate 3112.

The light emitter 3111 emits blue light BL. The blue light BL is excitation light that excites a phosphor of the wavelength converter 316. The light emitter 3111 is a semiconductor laser that outputs laser light having a peak wavelength of 455 nm.

The substrate 3112 is fixed to the light source housing CA while supporting the light emitter 3111. The substrate 3112 receives heat from the light emitter 3111 and transfers the received heat to the first heat dissipation member 312. That is, the substrate 3112 functions as a support substrate that supports the light emitter 3111, and also functions as a heat receiving substrate that receives the heat from the light emitter 3111.

Configuration of First Heat Dissipation Member

The first heat dissipation member 312 is exposed to the space outside the light source housing CA and dissipates the heat transferred from the light source 311 out of the light source housing CA. In detail, the first heat dissipation member 312 is disposed in a third duct 56, which will be described later, of the cooling apparatus 5, and dissipates the heat of the light emitter 3111 transferred from the substrate 3112. The first heat dissipation member 312 transfers the heat of the light emitter 3111 to the cooling gas flowing from the third fan 55, which will be described later, to cool the light emitter 3111.

The first heat dissipation member 312 is a heat sink having a plurality of fins 3121 along an XZ plane arranged along the Y-axis. That is, the first heat dissipation member 312 includes the plurality of fins 3121, and the cooling air is allowed to flow through the first heat dissipation member 312 along the X-axis.

Configuration of Diffusively Transmissive Section

The diffusively transmissive section 313 diffuses the blue light BL incident from the light source 311 and outputs light having a homogenized illuminance distribution. The blue light BL output from the diffusively transmissive section 313 is incident on the light separator 314. The diffusively transmissive section 313 can, for example, have a configuration including a hologram, a configuration in which a plurality of lenslets are arranged in a plane perpendicular to the optical axis, or a configuration in which a light passage surface is a rough surface.

In place of the diffusively transmissive section 313, the light source apparatus 31 may employ a homogenizer optical element including a pair of multi-lens arrays. On the other hand, when the diffusively transmissive section 313 is employed, the distance from the light source 311 to the light separator 314 can be reduced as compared with the case where the homogenizer optical element is employed.

Configuration of Light Separator

The light separator 314 has the function of a half-silvered mirror that transmits part of the blue light BL incident thereon from the light source 311 via the diffusively transmissive section 313 and reflects the remainder of the blue light BL. That is, the light separator 314 transmits first partial light that is part of the blue light BL incident from the diffusively transmissive section 313 toward the negative Z direction to cause the transmitted light to enter the first light collector 315, and reflects second partial light that is the remainder of the blue light BL toward the negative X direction to cause the reflected light to enter the second light collector 318.

The light separator 314 further has the function of a dichroic mirror that reflects fluorescence YL incident from the wavelength converter 316 in the positive Z direction and transmits the blue light BL incident from the diffusive reflector 319 in the positive X direction.

Configuration of First Light Collector

The first light collector 315 causes the first partial light having passed through the light separator 314 to be collected at the wavelength converter 316. Furthermore, the first light collector 315 parallelizes the fluorescence YL incident from the wavelength converter 316.

Configuration of Wavelength Converter

The wavelength converter 316 is a reflective wavelength converter that converts the wavelength of the light incident thereon, diffuses the converted light in the opposite direction of the direction of the incident light, and outputs the diffused light. The wavelength converter 316 includes a phosphor layer 3161 and a substrate 3162, and is directly or indirectly fixed to the light source housing CA.

The phosphor layer 3161 contains a phosphor excited by the blue light BL incident thereon, which is excitation light, and outputs the fluorescence YL having wavelengths longer than the wavelength of the incident blue light BL. The light output from the phosphor layer 3161 is the fluorescence YL, which is non-polarized light and has peak wavelengths ranging, for example, from 500 to 700 nm, and the fluorescence YL contains green light and red light.

The substrate 3162 supports the phosphor layer 3161 and receives heat from the phosphor layer 3161. Although not shown, a reflective layer that reflects the light incident from the phosphor layer 3161 is provided between the phosphor layer 3161 and the substrate 3162. Instead, the surface of the substrate 3162 at which the phosphor layer 3161 is provided may function as a reflection surface.

The fluorescence YL output from the wavelength converter 316 passes through the first light collector 315 along the optical axis Ax1 and is incident on the light separator 314. The fluorescence YL incident on the light separator 314 is reflected off the light separator 314 toward the positive X direction, and exits out of the light source apparatus 31 along the optical axis Ax2.

Configuration of Second Heat Dissipation Member

The second heat dissipation member 317 is exposed to the space outside the light source housing CA and dissipates the heat transferred from the wavelength converter 316 out of the light source housing CA. In detail, the second heat dissipation member 317 is disposed in a second duct 53, which will be described later, and dissipates the heat of the phosphor layer 3161 transferred from the substrate 3162. The second heat dissipation member 317 transfers the heat of the phosphor layer 3161 to the cooling gas flowing from the first fan 51, which will be described later, to cool the wavelength converter 316.

The second heat dissipation member 317 is a heat sink having a plurality of fins 3171 along the XZ plane arranged along the Y-axis. That is, the second heat dissipation member 317 includes the plurality of fins 3171, and the cooling air is allowed to flow to the second heat dissipation member 317 along the X-axis.

Configuration of Second Light Collector

The second light collector 318 causes the second partial light incident from the light separator 314 to be collected at the diffusive reflector 319. The second light collector 318 parallelizes the blue light incident from the diffusive reflector 319.

Configuration of Diffusive Reflector

The diffusive reflector 319 is fixed to the inner surface of the light source housing CA. The diffusive reflector 319 diffusively reflects the blue light BL incident from the second light collector 318 at the diffusion angle substantially equal to the diffusion angle of the fluorescence YL output from the wavelength converter 316 or the diffusion angle slightly smaller than the diffusion angle of the fluorescence YL. That is, the diffusive reflector 319 diffusively reflects the light incident thereon without converting the wavelength of the incident light.

The blue light BL reflected off the diffusive reflector 319 toward the positive X direction passes through the second light collector 318, then passes through the light separator 314 toward the positive X direction, and exits out of the light source apparatus 31 along with the fluorescence YL.

As described above, the illumination light WL, which exits out of the light source apparatus 31, is white light that is the mixture of the blue light BL and the fluorescence YL containing green light and red light.

Configuration of Wireless Communication Apparatus

The wireless communication apparatus 4 shown in FIG. 4 is electrically coupled to the control substrate described above, and wirelessly communicates with an external device that is not shown, for example, a video output apparatus. In detail, the wireless communication apparatus 4 receives a video signal from the video output apparatus and outputs the received video signal to the control substrate. The wireless communication apparatus 4 is disposed on the side opposite from the image formation unit 35 with respect to the first fan 51, which constitutes the cooling apparatus 5, which will be described later, and a second flow path of the second duct 53, which constitutes the cooling apparatus 5.

Configuration of Cooling Apparatus

The cooling apparatus 5 shown in FIG. 4 cools the cooling targets that constitute the projector 1. The cooling apparatus 5 includes the first fan 51, a first duct 52, the second duct 53, the second fan 54, the third fan 55, and the third duct 56. The first fan 51, the first duct 52, the second duct 53, the second fan 54, the third fan 55, and the third duct 56 are each provided inside the exterior housing 2.

The second fan 54, the third fan 55, and the third duct 56 will be described later in detail.

Configuration of First Fan

The first fan 51 is a double-sided-intake sirocco fan including intake sections 511 and 512 and a sending section 513. The first fan 51 is disposed adjacent to the wireless communication apparatus 4 in the positive Z direction with respect to the wireless communication apparatus 4 in such a way that the intake section 511 faces the negative Z direction, the intake section 512 faces the positive Z direction, and the sending section 513 faces the negative X direction.

The first fan 51 sucks the cooling gas flowing through the first duct 52 and sends the sucked cooling gas to the second duct 53. The first fan 51 thus causes the cooling gas to flow to the wireless communication apparatus 4 and the second heat dissipation member 317 to cool the wireless communication apparatus 4 and the second heat dissipation member 317. The heat is transferred from the wavelength converter 316 to the second heat dissipation member 317, as described above.

Configuration of First Duct

The first duct 52 is a duct through which the first fan 51 takes in the air, and causes the cooling gas introduced into the exterior housing 2 via the first intake ports 264 and the communication ports 2CA1 to flow to the first fan 51. That is, the first duct 52 causes the first fan 51 to communicate with the communication ports 2CA1 and the first intake ports 264, and the first fan 51 sucks the air outside the exterior housing 2 through the first duct 52.

The first duct 52 is formed by the inner side of the rear surface 22 of the exterior housing 2, a first surface 811 of a speaker housing 81, which constitutes the speaker unit 8, which will be described later, a sealer 86, which constitutes the speaker unit 8, and a surface 41 of the wireless communication apparatus 4, which faces the negative Z direction.

Configuration of Second Duct

The second duct 53 is a duct through which the first fan 51 exhausts the air, and couples the sending section 513 of the first fan 51 to the discharge ports 241. The second duct 53 is formed in a substantially L shape that extends from the sending section 513 of the first fan 51 toward the negative X direction, is then bent toward the positive Z direction, and is coupled to the discharge ports 241. The second duct 53 is so provided that the cooling gas can flow between the sending section 513 and the discharge ports 241, and constitutes the second flow path, at least part of which is formed by a surface 42 of the wireless communication apparatus 4, which faces the positive Z direction. In detail, part of the surface of the wireless communication apparatus 4 that faces the positive Z direction is exposed to the interior of the second duct 53, and the second heat dissipation member 317 is disposed in the second duct 53. That is, in the second flow path, which is formed by the second duct 53 and through which the cooling gas flows, the second heat dissipation member 317 is provided downstream from the position where the cooling gas cools the wireless communication apparatus 4. The amount of heat generated by second heat dissipation member 317 is greater than the amount of heat generated by the wireless communication apparatus 4.

Part of the cooling gas sent from the sending section 513 of the first fan 51 into the second duct 53 flows along the surface of the wireless communication apparatus 4 that faces the positive Z direction. A portion of the wireless communication apparatus 4 that faces the positive Z direction is thus cooled.

The cooling gas having flowed along the wireless communication apparatus 4 flows to the second heat dissipation member 317 along with the other cooling gas. The second heat dissipation member 317 is thus cooled, and the wavelength converter 316 is in turn cooled.

The cooling gas having flowed through the second heat dissipation member 317 flows toward the positive Z direction. The cooling gas having flowed toward the positive Z direction flows toward the negative X direction and is discharged out of the exterior housing 2 via the discharge ports 241.

The portion of the thus configured second duct 53 that faces the negative Y direction is formed by the base 6, which will be described later.

Configuration of Base

Figure 6:
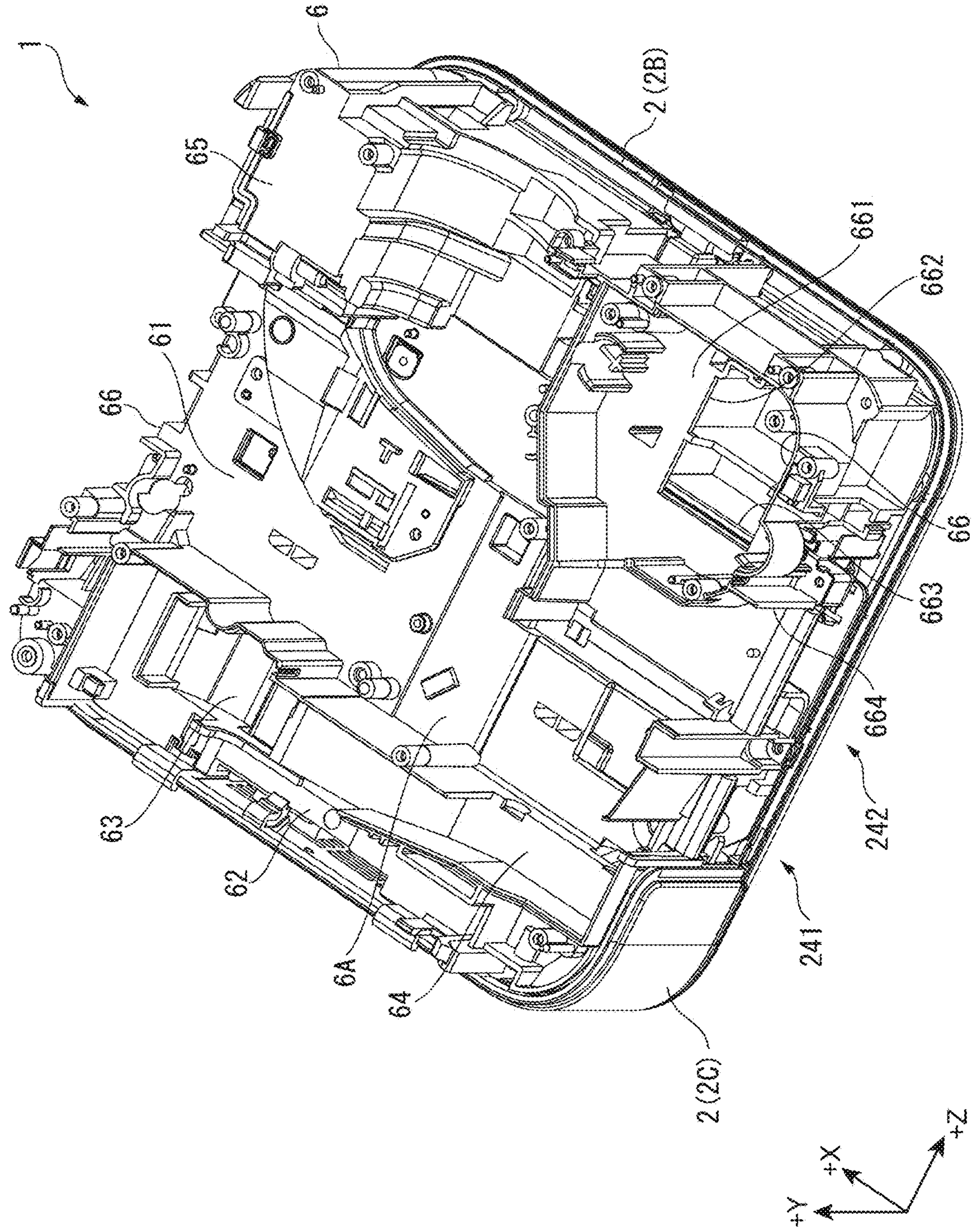
FIG. 6 is a perspective view showing a base according to the embodiment.

FIG. 6 is a perspective view showing the base 6 disposed in the exterior housing 2.

The base 6 is disposed inside the exterior housing 2 and supports the image projection apparatus 3, the wireless communication apparatus 4, and the cooling apparatus 5 from the side facing the negative Y direction. The base 6 includes a projection apparatus placement section 61, a communication apparatus placement section 62, a first fan placement section 63, a duct formation section 64, a second fan placement section 65, and a duct formation section 66, which are formed at a surface 6A facing the positive Y direction, as shown in FIG. 6.

The projection apparatus placement section 61 is a recessed portion in which the image projection apparatus 3 is disposed. The projection apparatus placement section 61 is formed at the center of the base 6 in the Z-axis, and has a substantially L shape according to the shape of the image projection apparatus 3 when viewed from the side facing the positive Y direction.

The communication apparatus placement section 62 is a recessed portion in which the wireless communication apparatus 4 is disposed. The communication apparatus placement section 62 is provided along the X-axis at a portion of the base 6 that faces the negative Z direction.

The first fan placement section 63 is a recessed portion in which the first fan 51 is disposed. The duct formation section 64 is a recessed portion that is combined with a lid member that is not shown to form the second duct 53. The first fan placement section 63 and a primary portion of the duct formation section 64 are provided between the projection apparatus section placement 61 and the communication apparatus placement section 62 along the −Z-axis.

The second fan placement section 65 is a portion where the second fan 54 is disposed so as to face the negative Y direction. In other words, the second fan placement section 65 is a portion that covers the second fan 54 from the side facing the positive Y direction. The second fan placement section 65 is provided in the base 6 at the portion facing the positive X direction and the positive Z direction.

The duct formation section 66 is a recessed portion in which the third fan 55 is disposed and which is combined with the duct member 57, which will be described later, to form the third duct 56. The duct formation section 66 is provided in the base 6 at the portion facing the negative X direction and the positive Z direction. The duct formation section 66 includes a third fan placement section 661, a first opening section 662, a second opening section 663, and a third opening section 664.

The third fan 55 is disposed in the third fan placement section 661.

The first opening section 662 and the second opening section 663 open substantially at the center of the third fan placement section 661. The first opening section 662 and the second opening section 663 are arranged side by side along the Z-axis, and pass through the base 6 along the Y-axis. The first opening section 662 communicates with the opening sections 2672 and 2673, which constitute the third intake ports 267, and the second opening section 663 communicates with an accommodation chamber 28, which will be described later.

The third opening section 664 is provided at the end of the duct formation section 66 that faces the negative X direction. The third opening section 664 communicates with the discharge ports 242.

Figure 7:
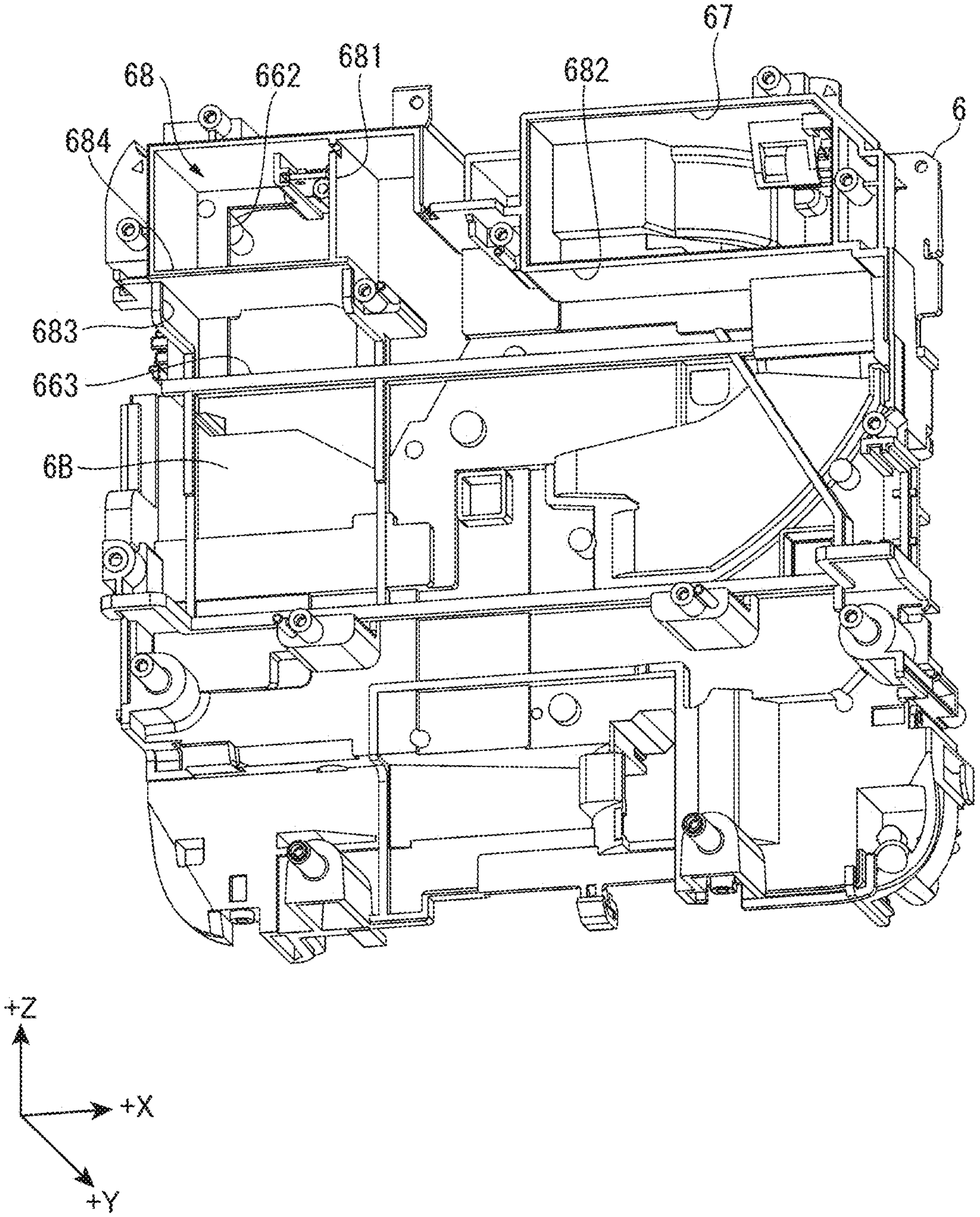
FIG. 7 is a perspective view showing the base according to the embodiment.

FIG. 7 is a perspective view showing the base 6 viewed from the side facing the negative Y direction.

In addition to the configuration described above, the base 6 includes duct formation sections 67 and 68 at a surface 6B facing the negative Y direction, as shown in FIG. 7.

The duct formation section 67 is provided in the base 6 at the portion facing the positive X direction and the positive Z direction. The duct formation section 67 is raised from the surface 6B toward the negative Y direction and has the shape of a frame. When the base 6 and the lower case 2B are combined with each other, the duct formation section 67 comes into contact with the inner surface of the lower case 2B and surrounds the second intake ports 266 shown in FIG. 3. That is, the duct formation section 67 constitutes a duct that couples the second intake ports 266 to the second fan 54 and guides the cooling gas introduced via the second intake ports 266 to the second fan 54.

The duct formation section 68 is provided in the base 6 at the portion facing the negative X direction and the positive Z direction. The duct formation section 67 is raised from the surface 6B toward the negative Y direction and has the shape of a frame. When combined with the lower case 2B, the duct formation section 68 constitutes a duct that guides the cooling gas introduced via the third intake ports 267 shown in FIG. 3 to the third fan 55.

The duct formation section 68 includes a first raised section 681, a second raised section 682, a third raised section 683, and a frame-shaped section 684. The first raised section 681, the second raised section 682, the third raised section 683, and the frame-shaped section 684 are in contact with the inner surface of the lower case 2B.

The first raised section 681 surrounds the opening sections 2671 of the third intake ports 267 shown in FIG. 2 when viewed from the side facing the negative Y direction. The first raised section 681 opens toward the positive X direction and the negative Z direction, and causes the cooling gas introduced via the opening sections 2671 to flow toward the second raised section 682.

The second raised section 682 is provided so as to be shared by a portion of the duct formation section 67 that faces the negative Z direction. The second raised section 682 extends along the X-axis, and guides the cooling gas flowing from the first raised section 681 to the accommodation chamber 28, which will be described later. The third raised section 683 separates the first opening section 662 and the second opening section 663 from each other in the space shifted from the base 6 toward the negative Y direction, and prevents the cooling gas introduced via the opening sections 2672 and 2673 of the third intake ports 267 shown in FIG. 2 from flowing into the accommodation chamber 28.

The frame-shaped section 684 is in contact with the inner surface of the lower case 2B and surrounds the opening sections 2672 and 2673. The frame-like section 684 causes the opening sections 2672 and 2673 to communicate with the first opening 662. That is, the frame-shaped section 684 constitutes a duct that couples the opening sections 2672 and 2673 to the third fan 55 and directly guides the cooling gas introduced via the opening sections 2672 and 2673 to the third fan 55.

The flow of the cooling gas guided via the third intake ports 267 to the third fan 55 by the thus configured duct formation section 68 will be described later in detail.

Configuration of Control Substrate

Figure 8:
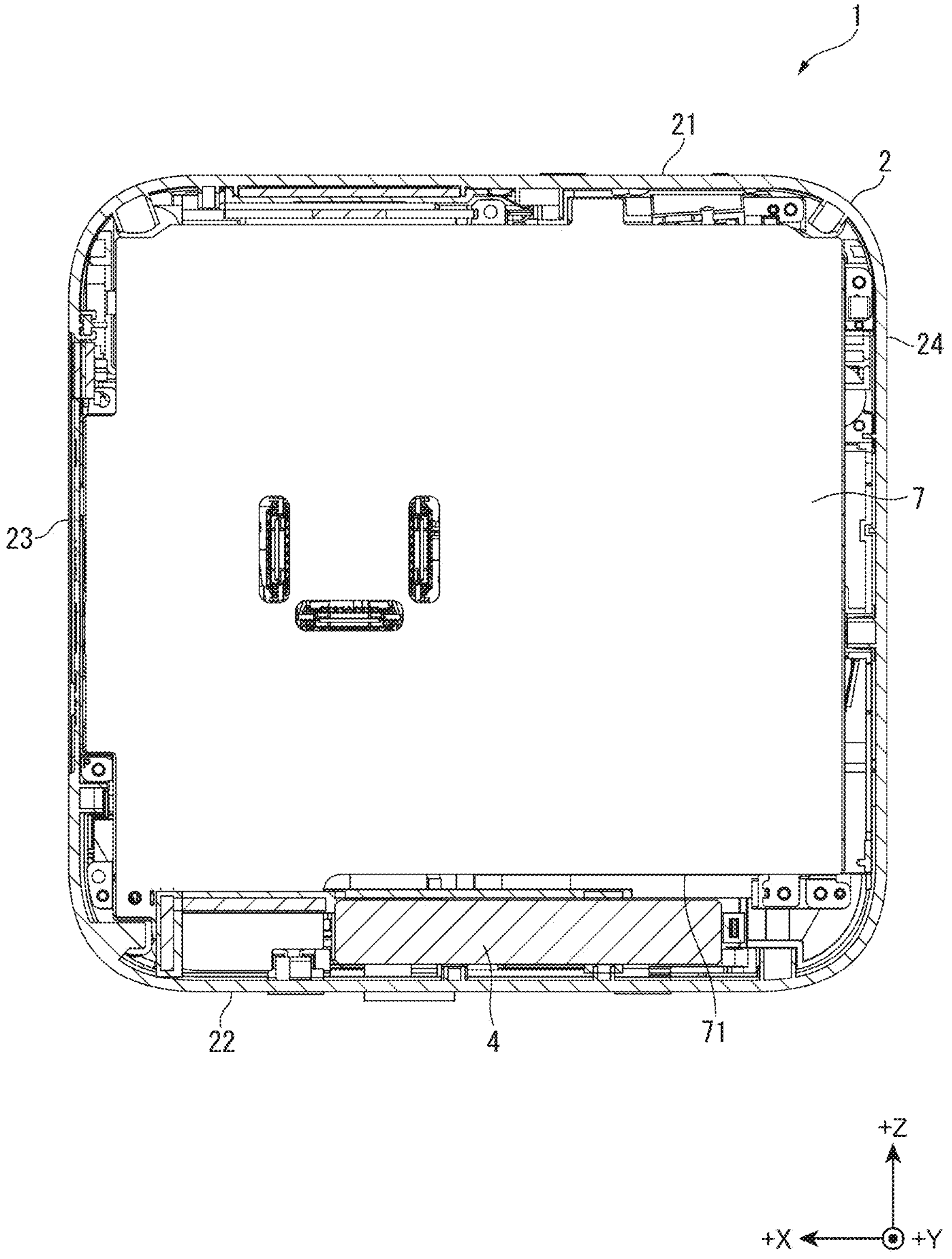
FIG. 8 is a plan view showing a control substrate according to the embodiment.

FIG. 8 shows a cross section of the projector 1 taken along an XZ plane, and is a plan view of the control substrate 7 in the exterior housing 2 viewed from the side facing the positive Y direction.

The control substrate 7 is disposed in an upper layer space of the exterior housing 2 that is shifted toward the positive Y direction from the image projection apparatus 3 and the components other than the first duct 52 of the cooling apparatus 5 shown in FIG. 4, and controls the projector 1. For example, the control substrate 7 controls turning on and off the light source apparatus 31, image formation performed by the image formation unit 35, cooling the cooling targets performed by the cooling apparatus 5, and other types of operation.

The control substrate 7 is a substantially rectangular substrate, as shown in FIG. 8. The control substrate 7 has a cutout 71 provided at a portion shifted toward the negative X direction and the negative Z direction. The cutout 71 is a portion that allows the control substrate 7 not to interfere with the wireless communication apparatus 4.

Although not shown in FIG. 8, the control substrate 7 includes a plurality of circuit elements mounted on the surface facing the negative Y direction. For example, the control substrate 7 includes the light source drive circuit 72, which controls the operation of driving the light source apparatus 31. The light source drive circuit 72 will be described later in detail.

Configuration of Lower Portion of Projector

Figure 9:
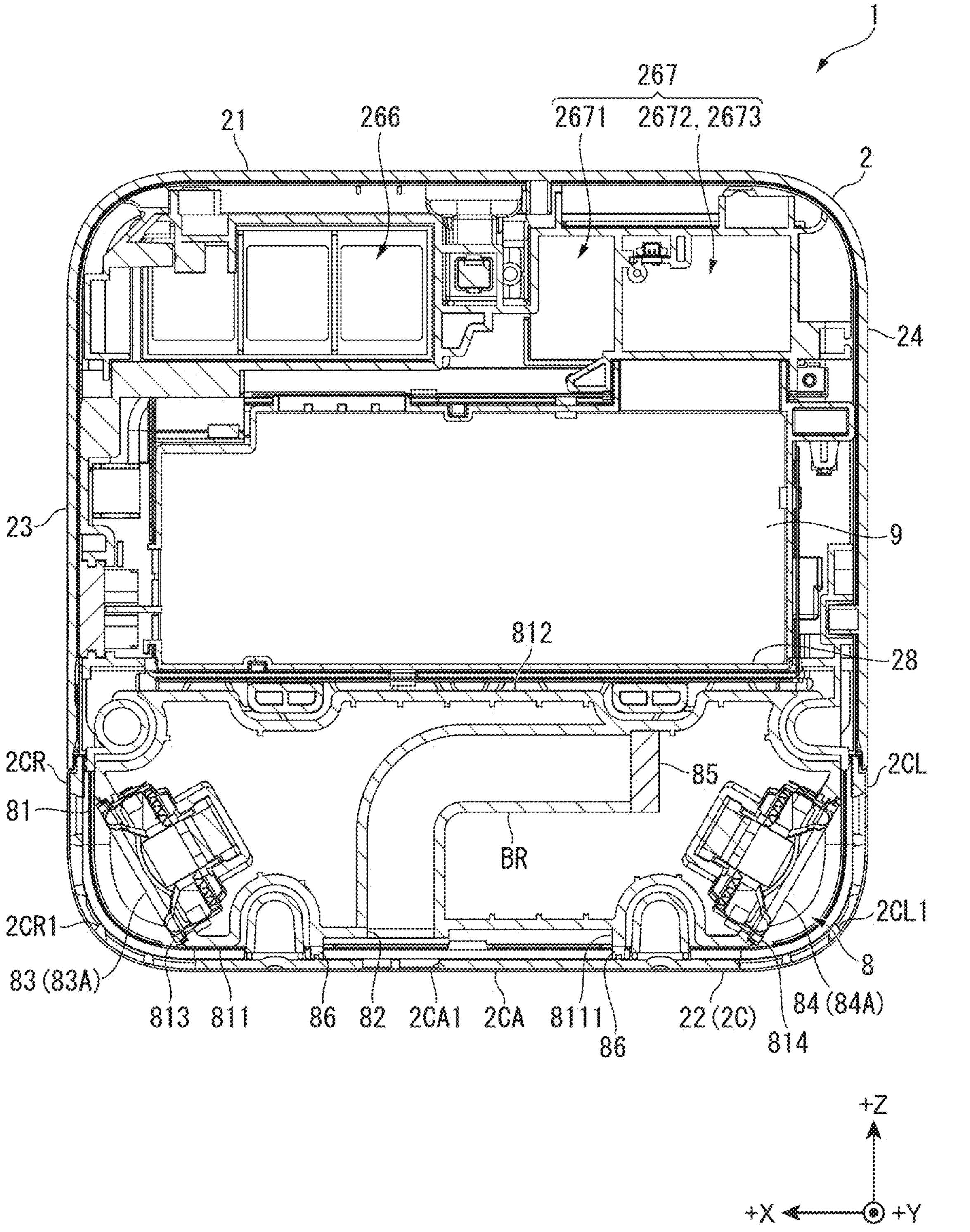
FIG. 9 is a cross-sectional view showing the configuration of a lower portion of the projector according to the embodiment.

FIG. 9 shows the configuration of a lower portion of the projector 1, and specifically shows a cross section of the projector 1 taken along an XZ plane. The projector 1 includes, in addition to the configuration described above, the speaker unit 8 and the power supply apparatus 9, which are disposed in a portion in the exterior housing 2 that is shifted toward the negative Y direction, as shown in FIG. 9.

Configuration of Speaker Unit

The speaker unit 8 is disposed in a portion of the exterior housing 2 that is shifted toward the negative Y direction and the negative Z direction, and outputs voice according to a voice signal input from the control substrate 7. In addition, the speaker unit 8, which is disposed in the exterior housing 2, constitutes, along with the inner side of the rear surface 22, the first duct 52.

The speaker unit 8 includes the speaker housing 81, the first sound emitter 82, the second sound emitters 83 and 84, a porous member 85, and the sealer 86.

The speaker housing 81 is an enclosure that supports the first sound emitter 82, the second sound emitters 83 and 84, the porous member 85, and the sealer 86. The speaker housing 81 has a first surface 811, a second surface 812, a third surface 813, and a fourth surface 814, and is formed in a lateral truncated quadrangular pyramidal shape. That is, the speaker housing 81 is so shaped that the dimension thereof along the X-axis decreases as the speaker housing 81 extends toward the negative Z direction.

The first surface 811 is a surface facing the negative Z direction and opposes the inner surface of the rear surface section 2CA of the fabric unit 2C. In detail, the first surface 811 opposes the communication ports 2CA1 of the rear surface section 2CA.

The first surface 811 is provided with a recess 8111, which is recessed toward the positive Z direction. The recess 8111 widens the first duct 52, through which the cooling gas introduced into the exterior housing 2 via the first intake ports 264 flows.

The second surface 812 is a surface opposite from the first surface 811.

The third surface 813 is a surface facing the positive X direction and the negative Z direction. That is, the third surface 813 is an inclining surface inclining with respect to each of the XY plane and the YZ plane.

The fourth surface 814 is a surface facing the negative X direction and the negative Z direction. That is, the fourth surface 814 is an inclining surface inclining with respect to each of the XY plane and the YZ plane.

Although not shown, the speaker housing 81 has a fifth surface that faces the positive Y direction and opposes the wireless communication apparatus 4 and the first fan 51, and a sixth surface that faces the negative Y direction and opposes the inner side of the bottom surface 26.

The thus configured speaker housing 81 is disposed so as to oppose the communication ports 2CA1 and the first intake ports 264.

The first sound emitter 82 is provided at the first surface 811. In detail, the first sound emitter 82 is disposed at the bottom of the recess 8111. The first sound emitter 82 is the exit-side port of a bass reflex duct BR provided in the speaker housing 81. The first sound emitter 82 therefore outputs a low-pitched sound.

The entrance-side port of the bass reflex duct BR is disposed in the speaker housing 81. The porous member 85 is provided at the entrance-side port of the bass reflex duct BR. The porous member 85 is provided inside the speaker housing 81 so as to cover the entire entrance-side port.

The thus configured porous member 85 reduces the flow speed of the air flowing through the bass reflex duct BR at the exit-side port, and can therefore suppress port noise and wind noise generated at the first sound emitter 82, which is the exit-side port. The porous member 85 may be provided so as to cover the entire first sound emitter 82 when viewed from the side facing the negative Z direction, or may be provided between the entrance-side port and the exit-side port. The porous member 85 can be made, for example, of sponge.

The second sound emitters 83 and 84 each emit voice according to a voice signal input from the control substrate 7. The second sound emitters 83 and 84 are each a full-range speaker, and can emit a higher-pitched sound than the sound emitted from the first sound emitter 82. That is, the second sound emitters 83 and 84 can each emit a different-pitched sound from the sound emitted from the first sound emitter 82.

The second sound emitter 83 is provided at the third surface 813, and a sound emission surface 83A, via which the second sound emitter 83 emits the sound, faces the positive X direction and the negative Z direction. The sound emitted from the second sound emitter 83 exits out of the exterior housing 2 via the right sound emission ports 2CR1 and the fabric 2C1 of the fabric unit 2C.

The second sound emitter 84 is provided at the fourth surface 814, and a sound emission surface 84A, via which the second sound emitter 84 emits the sound, faces the negative X direction and the negative Z direction. The sound emitted from the second sound emitter 84 exits out of the exterior housing 2 via the left sound emission ports 2CL1 and the fabric 2C1 of the fabric unit 2C.

Arranging the second sound emitters 83 and 84 as described above allows effective spread of the sound outside the exterior housing 2.

The sealer 86 is provided between the inner surface of the fabric unit 2C, which constitutes the exterior housing 2, and the speaker housing 81, and seals the space between the inner surface of the fabric unit 2C and the outer surface of the speaker housing 81. In the present embodiment, the sealer 86 is fixed to the speaker housing 81 with an adhesive or a double-sided adhesive tape.

In detail, the sealer 86 is provided across the first surface 811, the fifth surface, and the sixth surface. The sealer 86 is provided between the speaker housing 81 and the inner surface of the exterior housing 2, and surrounds the first sound emitter 82 to separate the space in which the first sound emitter 82 is disposed from the space in which the second sound emitters 83 and 84 are disposed. That is, the sealer 86 separates the second sound emitters 83 and 84 from the airflow that the first fan 51 causes to flow through the space in which the first sound emitter 82 is disposed.

The thus configured speaker unit 8 disposed inside the exterior housing 2 constitutes part of the first duct 52.

Configurations of Power Supply Apparatus and Accommodation Chamber

The power supply apparatus 9 is a power supply substrate that supplies electronic parts of the projector 1 with electric power. Although not shown, the power supply apparatus 9 includes a plurality of circuit elements that constitute a power supply circuit, and the plurality of circuit elements are heat sources that generate heat when the power supply apparatus 9 is driven. The power supply apparatus 9 is accommodated in the accommodation chamber 28 provided inside the exterior housing 2.

The accommodation chamber 28 is a recessed portion provided at a portion of the exterior housing 2 that is shifted toward the negative Y direction and at the center of the exterior housing 2 along the Z-axis, and accommodates the power supply apparatus 9.

The power supply apparatus 9 and the accommodation chamber 28 are covered with the base 6 described above from the side facing the positive Y direction.

Configuration of Second Fan

Figure 10:
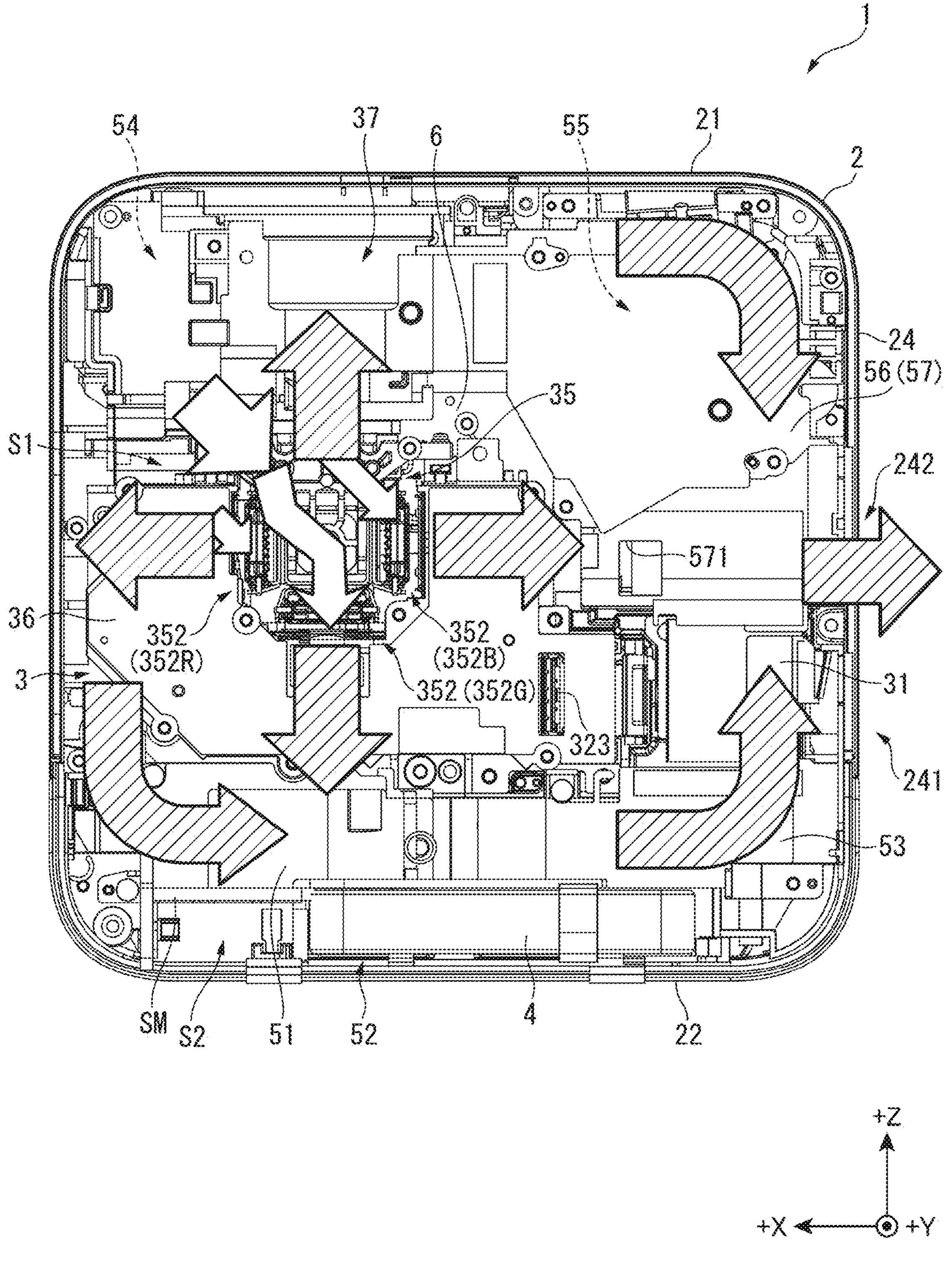
FIG. 10 shows the flow direction of a cooling gas sent from a second fan according to the embodiment.

FIG. 10 shows the flow direction of the cooling gas sent from the second fan 54.

The second fan 54 shown in FIG. 4 corresponds to a second cooling fan. The second fan 54 is provided inside the exterior housing 2 at the corner facing the positive X direction and the positive Z direction. The second fan 54 sucks the air outside the exterior housing 2 as the cooling gas via the second intake ports 266, and sends the resultant cooling air to the image formation unit 35 and the control substrate 7, the latter of which is disposed at a position shifted from the image projection apparatus 3 toward the positive Y direction. The cooling air sent by the second fan 54 corresponds to second cooling air.

Specifically, the second fan 54 sends the cooling air to the image formation unit 35 and the polarization converter 323 via a duct member that is not shown but is provided in the base 6. As indicated by the open arrows in FIG. 10, the duct member divides the cooling air sent from the second fan 54, and causes the divided cooling airflows to flow to the optical modulators 352R, 352G, and 352B of the image formation unit 35 and also to the polarization converter 323. The cooling airflows having flowed to the optical modulators 352R, 352G, and 352B and the polarization converter 323 flow toward the positive Y direction while cooling the optical modulators 352R, 352G, and 352B and the polarization converter 323.

The cooling airflows having cooled the optical modulators 352R, 352G, and 352B and the polarization converter 323 flow along the surface of the control substrate 7 shown in FIG. 8 that faces the negative Y direction. The circuit elements mounted on the surface of the control substrate 7 that faces the negative Y direction are thus cooled.

The cooling air sent from the second fan 54 causes a space S1 of the exterior housing 2, where the image projection apparatus 3 and the control substrate disposed, to have a positive pressure. Incidentally, the space communicates with the discharge ports 241. The positive pressure can be generated by the delivery force produced by the second fan 54 and the discharge resistance exerted by the discharge ports 241.

Therefore, the cooling air having cooled the image formation unit 35 including the light modulators 352, the polarization converter 323, and the control substrate 7 is diffused in the exterior housing 2 as indicated by the hatched arrows in FIG. 10, and is then pushed out toward the second opening 2423 of the discharge ports 242 by the positive pressure in the space S1, and is attracted by the cooling air flowing through the third duct 56, which will be described later, and discharged via the first opening 2422 of the discharge ports 242, and is discharged out of the exterior housing 2 via the second opening 2423.

In the exterior housing 2, a space S2, where the wireless communication apparatus 4, the first fan 51, and the speaker unit 8 are disposed, is separated from the space S1 described above by a sealing member SM. The configuration described above prevents the cooling gas flowing through the space S1 from flowing into the space S2, and prevents the cooling air flowing through the space S1 from being sucked by the first fan 51. That is, the sealing member SM thermally separates the space S1 and the space S2 from each other.

Configuration of Third Duct

Figure 11:
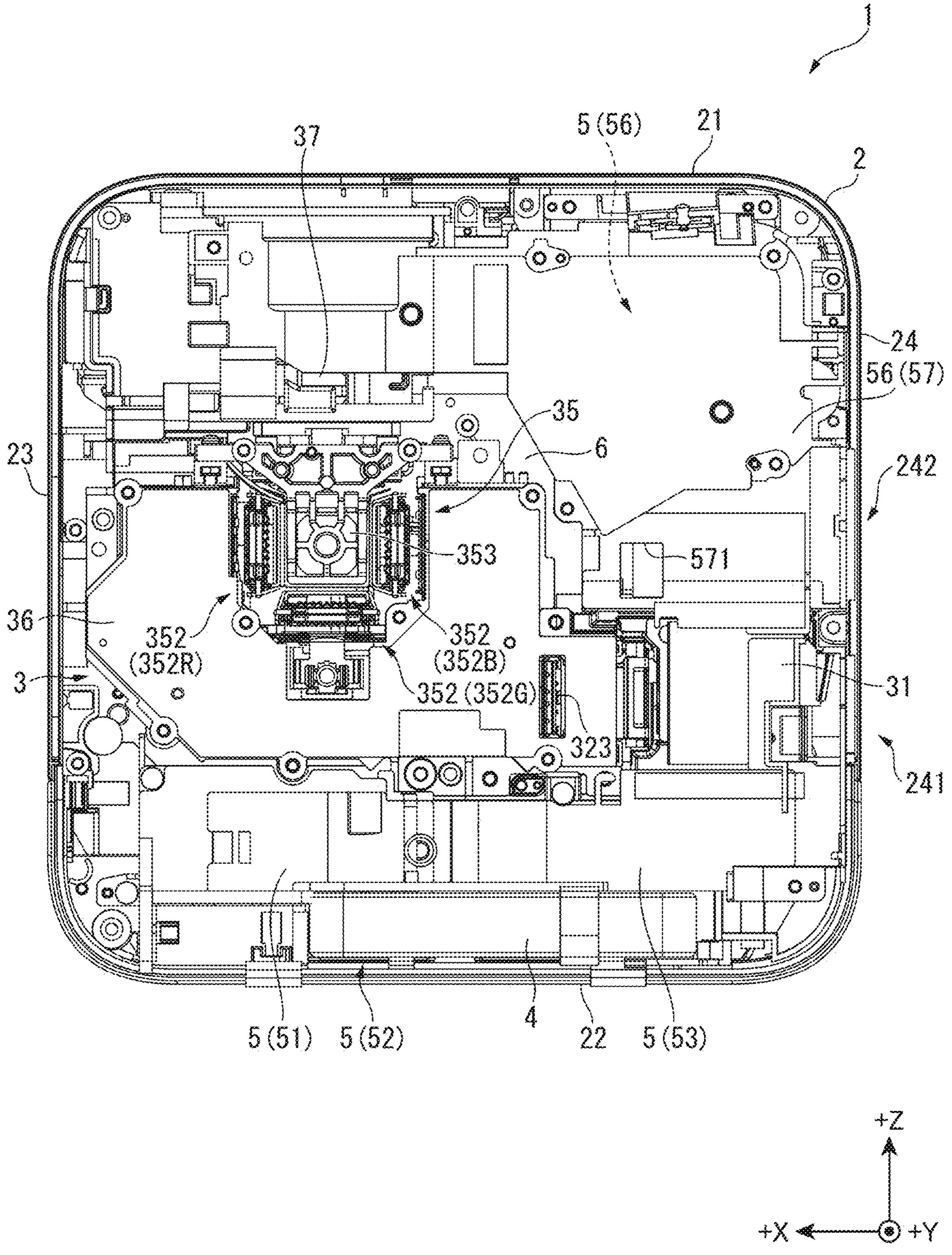
FIG. 11 shows a duct member that constitutes a third duct according to the embodiment.

FIG. 11 shows the duct member 57, which constitutes the third duct 56. In other words, FIG. 11 is a plan view of the projector 1 viewed from the side facing the positive Y direction with the upper case 2A and the control substrate 7 removed.

The third duct 56 guides the cooling air sent from the third fan 55 to the first heat dissipation member 312, which is a first cooling target, and the light source drive circuit 72, which is a second cooling target. Furthermore, the third duct 56 guides the cooling air having cooled the first heat dissipation member 312 to the discharge ports 242.

The third duct 56 is formed by the combination of the duct formation section 66 of the base 6 and the duct member 57 shown in FIG. 11. That is, the cooling apparatus 5 includes the duct member 57.

The duct member 57 is combined with the base 6 so as to cover the duct formation section 66 from the side facing the positive Y direction, and is coupled to the discharge ports 242. In the present embodiment, in addition to covering the duct formation section 66, the duct member 57 extends from the duct formation section 66 toward the positive X direction and covers the projection optical apparatus 37 from the side facing the positive Y direction.

The duct member 57 has a flow port 571, through which the cooling air flows to the light source drive circuit 72 provided on the control substrate 7 at a position shifted from the light source apparatus 31 toward the positive Y direction. The flow port 571 passes through the duct member 57 along the Y-axis. Although will be described later in detail, the cooling air having passed through the flow port 571 and flowed to the light source drive circuit 72, which will be described later, flows along the control substrate 7, and is discharged out of the exterior housing 2 via the second opening 2423 of the discharge ports 242. That is, the duct member 57 functions as a separation member that separates the space which extends from the plurality of fins 3121 of the first heat dissipation member 312 to the discharge ports 242 and through which cooling air FW31 flows from the space which extends from the light source drive circuit 72 to the discharge ports 242 and through which cooling air FW32 flows. The cooling air FW31 is part of cooling air FW3 sent from the third fan 55, and the cooling air FW32 is the remainder of the cooling air FW3 sent from the third fan 55.

Configuration and Function of Third Fan

Figure 12:
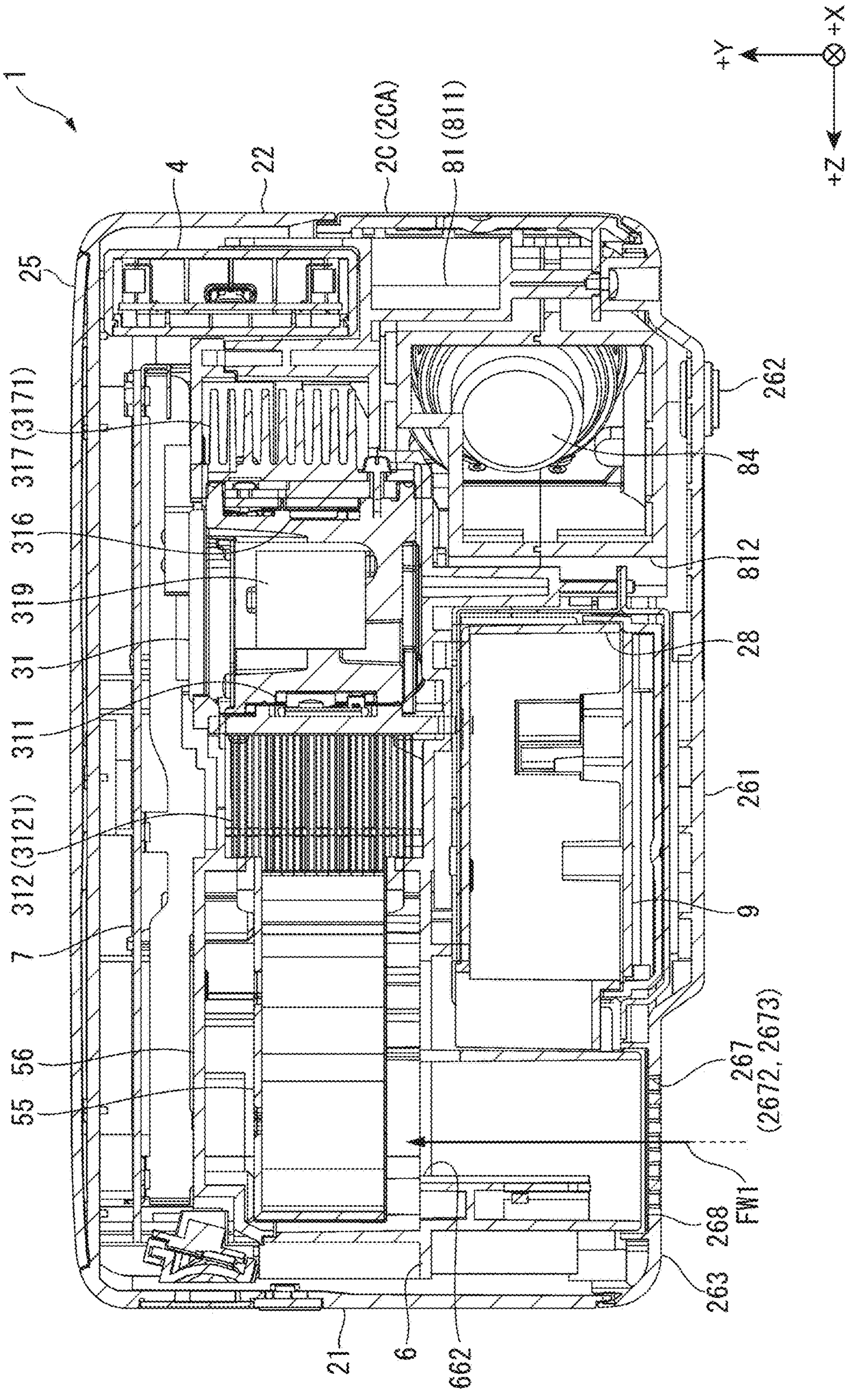
FIG. 12 describes the flow of the cooling gas sucked by a third fan according to the embodiment.

FIG. 12 describes the flow of the cooling gas sucked by the third fan 55.

The third fan 55 corresponds to a first cooling fan. The third fan 55 is disposed in the third duct 56 so as to oppose the third intake ports 267. The third fan 55 sucks the cooling gas introduced via the third intake ports 267 at the surface facing the negative Y direction, and sends the sucked cooling gas to cause the cooling gas to flow to the first heat dissipation member 312 and the light source drive circuit 72 via the third duct 56.

In detail, the third fan 55 directly sucks the air outside the exterior housing 2 via the openings 2672 and 2673 of the third intake ports 267 through the first opening 662, which opens in the third fan placement section 661 of the base 6, as shown in FIG. 12. The cooling air that reaches the third fan 55 via the openings 2672 and 2673 is referred to as cooling air FW1.

Figure 13:
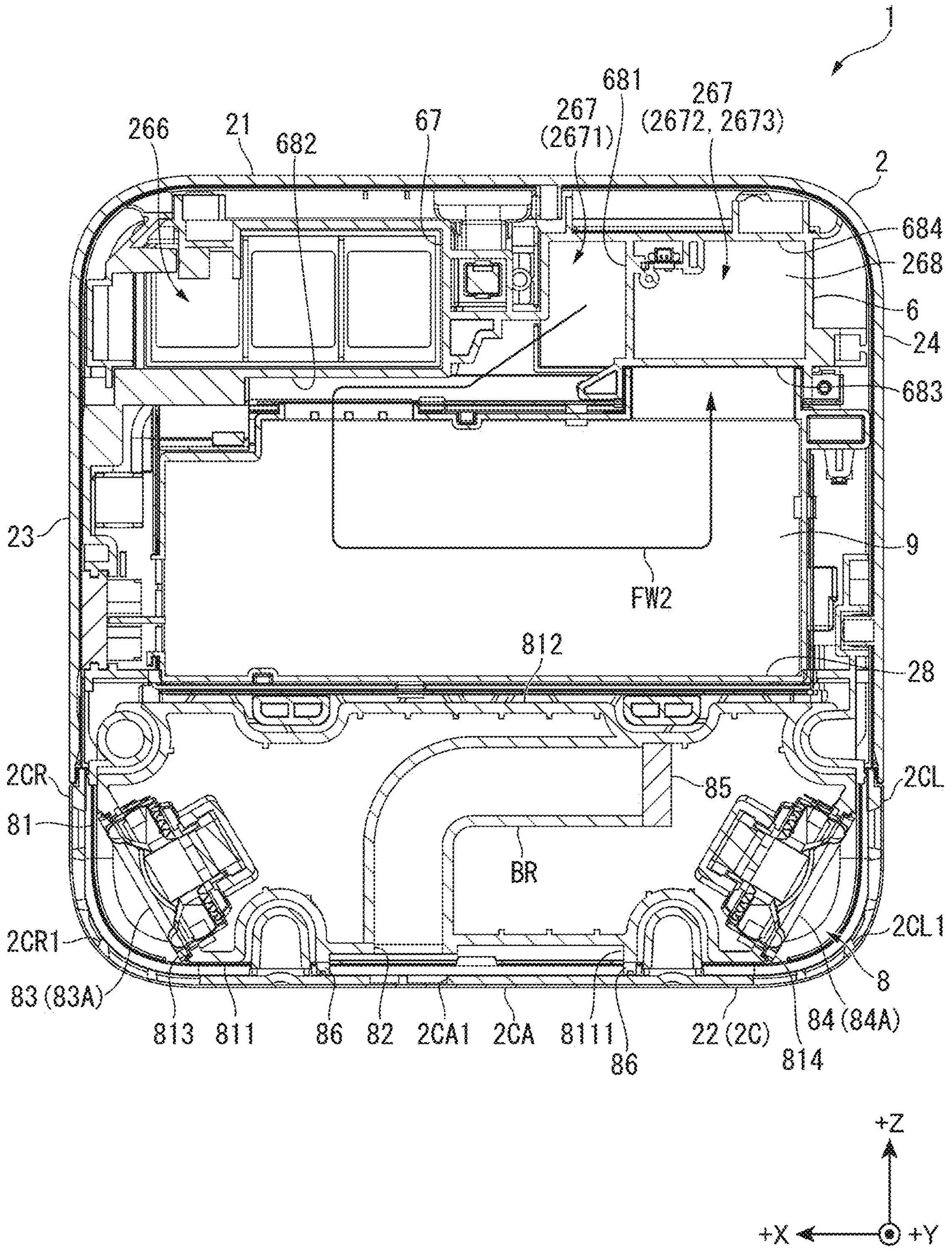
FIG. 13 shows the flow direction of the cooling gas introduced into an exterior housing according to the embodiment.

FIG. 13 shows the flow direction of the cooling gas introduced into the exterior housing 2 via the opening sections 2671 of the third intake ports 267.

Incidentally, the suction force produced by the third fan 55 prevents the cooling gas introduced into the exterior housing 2 via the opening sections 2671 of the third intake ports 267 from directly flowing to the third fan 55 with the aid of the first raised section 681, which partially surrounds the opening sections 2671, and the base 6. Therefore, the cooling gas introduced via the opening sections 2671 flows toward the second raised section 682 in the positive X direction and flows as cooling air FW2 into the accommodation chamber 28.

The cooling air FW2 having flowed into the accommodation chamber 28 flows along the power supply apparatus 9 toward the negative X direction with the aid of the suction force produced by the third fan 55 to cool the power supply apparatus 9. The cooling air FW2 having cooled the power supply apparatus 9 flows toward the positive Z direction, flows out of the accommodation chamber 28, and flows along the third raised section 683 toward the positive Y direction. The cooling air FW2 having flowed toward the positive Y direction is then sucked by the third fan 55 via the second opening section 663, which opens in the third fan placement section 661 of the base 6.

Figure 14:
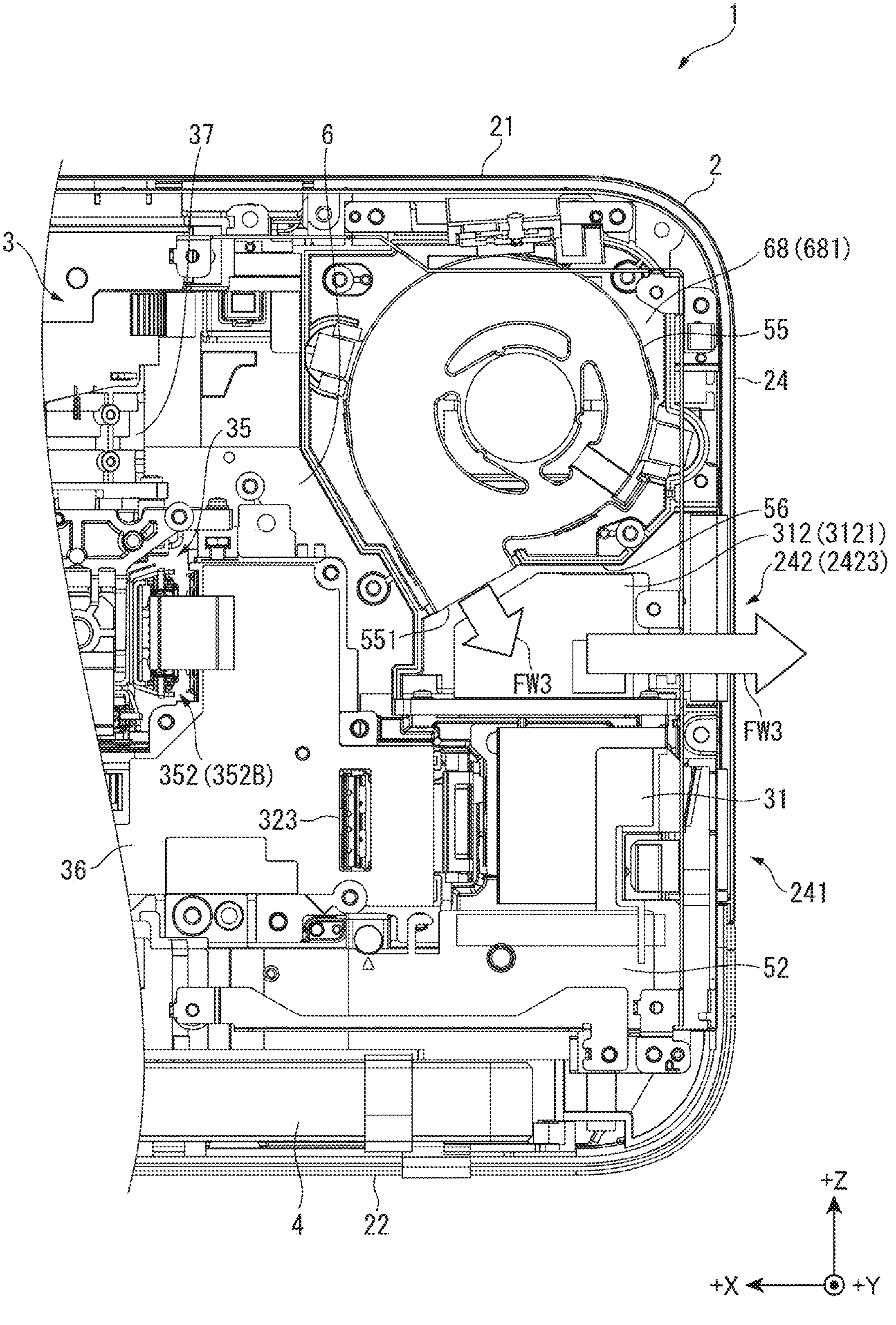
FIG. 14 shows the flow direction of cooling air sent from the third fan according to the embodiment.
Figure 15:
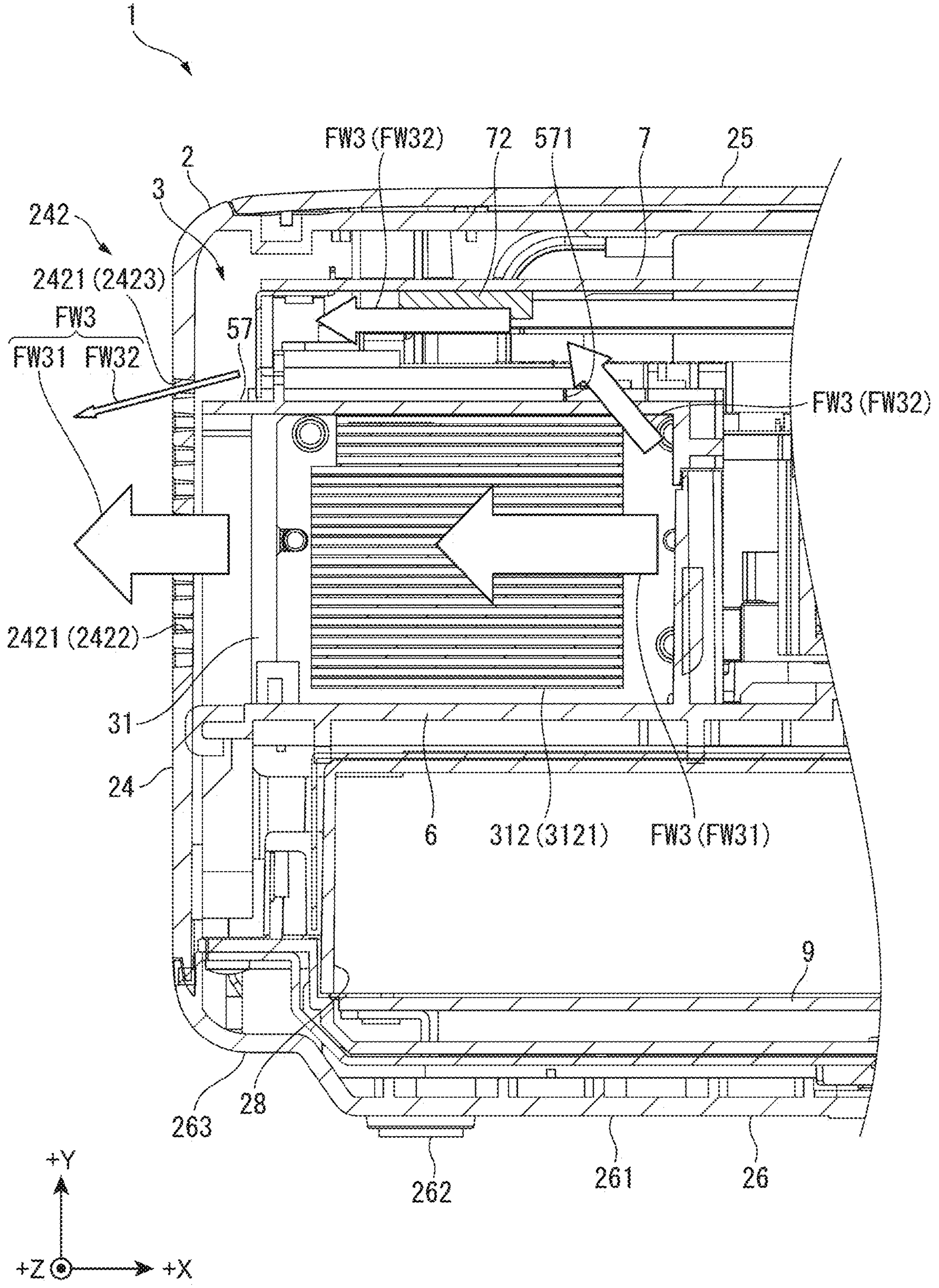
FIG. 15 shows the flow direction of the cooling air sent from the third fan according to the embodiment.

FIG. 14 shows the flow direction of the cooling air sent from the third fan 55 into the third duct 56. FIG. 15 shows a cross section of the first heat dissipation member 312 of the projector 1 taken along an XY plane, and further shows the flow direction of the cooling air sent out from the third fan 55.

The third fan 55 sends the cooling air FW1 and FW2 sucked via the third intake ports 267 into the third duct 56 to cause the cooling air FW3 to flow to the first heat dissipation member 312 as the first cooling target and the light source drive circuit 72 as the second cooling target, as shown in FIG. 14. The cooling air sent by the third fan 55 corresponds to first cooling air.

Specifically, the cooling air FW31, which is part of the cooling air FW3, flows between the fins 3121 of the first heat dissipation member 312 to cool the first heat dissipation member 312, and is then discharged out of the exterior housing 2 via the first opening 2422 of the discharge ports 242, as shown in FIG. 15. That is, the cooling air FW31 sent from a sending section 551 of the third fan 55 and flowing between the plurality of fins 3121 of the first heat dissipation member 312 flows to the first opening 2422 with the aid of the delivery force produced by the third fan 55. Part of the flow path through which the cooling air FW31 flows is thus formed between the plurality of fins 3121.

The cooling air FW31 is then discharged via the first opening 2422 disposed at a position where the first opening 2422 opposes the plurality of fins 3121 at a position downstream from the plurality of fins 3121 in the flow path in the third duct 56, through which the cooling air FW31 flows.

On the other hand, out of the cooling air FW3 sent from the third fan 55, the other cooling air FW32 flows toward the positive Y direction with respect to the duct member 57 via the flow port 571 of the duct member 57. That is, the cooling air FW32 flows into the space S1, where the positive pressure is created when the second fan 54 sends the cooling air in the exterior housing 2.

The light source drive circuit 72, provided on the control substrate 7, is disposed in the space S1, where the positive pressure is created by the second fan 54, and is juxtaposed with the first heat dissipation member 312 along the Y-axis. That is, the light source drive circuit 72 is disposed on the control substrate 7 at a position shifted from the first heat dissipation member 312 toward the positive Y direction.

The cooling air FW32 having flowed between the duct member 57 and the control substrate 7 via the flow port 571, which opens upstream from the position where the cooling air FW3 cools the first heat dissipation member 312, flows along the light source drive circuit 72 to cool the light source drive circuit 72.

The cooling air FW32 having cooled the light source drive circuit 72 is discharged via the second opening 2423 provided at a position shifted from the duct member 57 toward the positive Y direction out of the plurality of openings 2421, which constitute the discharge ports 242.

The second opening 2423 is also an opening via which the gas in the space S1 is discharged. The cooling air FW32 is therefore pushed out by the positive pressure in the space S1 toward the discharge ports 242 and discharged via the second opening 2423. The efficiency at which the cooling air FW32 is discharged can thus be increased.

The amount of heat generated by the first heat dissipation member 312 is greater than the amount of heat generated by the light source drive circuit 72. Therefore, the first heat dissipation member 312 is disposed in the flow path of the cooling air FW31 flowing from the third fan 55 by a large amount and at a high pressure, and the cooling air FW31 having flowed through the first heat dissipation member 312 flows to the first opening 2422 with the aid of the delivery force produced by the third fan 55.

On the other hand, although the amount by and the pressure at which the cooling air FW32 is sent are smaller than the amount by and the pressure at which the cooling air FW31 is sent, the amount of heat generated by the light source drive circuit 72 is smaller than the amount of heat generated by the first heat dissipation member 312, and the positive pressure in the space S1 acts on the cooling air FW32. The efficiency at which the cooling air FW32 having cooled the light source drive circuit 72 is discharged can therefore be increased, and the efficiency at which the light source drive circuit 72 is cooled can in turn be increased.

Effects of Embodiment

The projector 1 according to the present embodiment described above provides the effects below.

The projector 1 includes the exterior housing 2, the first heat dissipation member 312, the second fan 54, the third fan 55, and the light source drive circuit 72.

The exterior housing 2 has the discharge ports 242 having the plurality of openings 2421.

The first heat dissipation member 312 corresponds to the first cooling target, and includes the plurality of fins 3121.

The light source drive circuit 72 corresponds to the second cooling target, and is juxtaposed with the first heat dissipation member 312.

The third fan 55 corresponds to a first cooling fan. The third fan 55 sucks the air outside the exterior housing 2 via the third intake ports 267, and sends the sucked outside air as the cooling air FW3 to each of the first heat dissipation member 312 and the light source drive circuit 72. The cooling air sent by the third fan 55 corresponds to first cooling air.

The second fan 54 corresponds to the second cooling fan. The second fan 54 sucks the air outside the exterior housing 2 via the second intake ports 266, sends the sucked outside air as cooling air into the exterior housing 2 to create the positive pressure in the space S1 in the exterior housing 2. The cooling air sent by the second fan 54 corresponds to second cooling air.

The plurality of fins 3121 constitute part of the flow path through which the cooling air FW31, which is part of the cooling air FW3, flows between the plurality of fins 3121.

Out of the plurality of openings 2421, the first opening 2422 is disposed at a position where the first opening 2422 opposes the plurality of fins 3121 at a position downstream from the plurality of fins 3121 in the flow path through which the cooling air FW31 flows.

The light source drive circuit 72 is disposed in the space S1, where the positive pressure is created inside the exterior housing 2.

The cooling air FW31 sent from the third fan 55 and flowing between the plurality of fins 3121 of the first heat dissipation member 312 flows to the first opening 2422 with the aid of the delivery force produced by the third fan 55.

The cooling air FW32 flowing from the third fan 55 to the light source drive circuit 72 flows through the second opening 2423 with the positive pressure in the exterior housing 2 acting on the cooling air FW32.

According to the configuration described above, out of the first heat dissipation member 312 and the light source drive circuit 72, which are juxtaposed with each other, the first heat dissipation member 312 is cooled by the cooling air FW31 flowing between the plurality of fins 3121 and discharged via the discharge ports 242, and the light source drive circuit 72 is cooled by the cooling air FW32 sent from the third fan 55 and discharged via the discharge ports 242 with the positive pressure in the exterior housing 2 acting on the cooling air FW32. The first heat dissipation member 312 can therefore be effectively cooled by the cooling air FW31 discharged via the discharge ports 242 with the aid of the delivery force produced by the third fan 55, and the cooling air FW31 having cooled the first heat dissipation member 312 can be quickly discharged. Furthermore, the light source drive circuit 72 can be effectively cooled by the cooling air FW32 discharged via the discharge ports 242 with the positive pressure in the exterior housing 2 acting on the cooling air FW32, and the cooling air FW32 having cooled the light source drive circuit 72 can be quickly discharged. The efficiency at which the first heat dissipation member 312 and the light source drive circuit 72 are each cooled can therefore be increased, so that the size of the projector 1 can be reduced, and the noise due to the fans can be reduced, as compared with a case where a cooling fan that cools the first heat dissipation member 312 and a cooling fan that cools the light source drive circuit 72 are separately provided.

In the projector 1, the amount of heat generated by the first heat dissipation member 312, through which the cooling air FW31 discharged via the discharge ports 242 with the aid of the delivery pressure produced by the third fan 55 flows, is greater than the amount of heat generated by the light source drive circuit 72, through which the cooling air FW32 on which the positive pressure in the space S1 acts flows.

According to the configuration described above, the cooling air FW31 from the third fan 55 flows through the first heat dissipation member 312 without the cooling air FW31 stagnating, the first heat dissipation member 312, which generates an amount of heat greater than the amount of heat generated by the light source drive circuit 72, can be effectively cooled by the cooling air FW31. In addition, since the first heat dissipation member 312 includes the plurality of fins 3121, the heat dissipation efficiency of the first heat dissipation member 312 is higher than the heat dissipation efficiency of the light source drive circuit 72. The first heat dissipation member 312 can therefore be effectively cooled by the cooling air FW31.

In the projector 1, the first cooling target is the first heat dissipation member 312, which dissipates the heat of the light source 311 provided in the light source apparatus 31, which outputs light, and the second cooling target is the light source drive circuit 72, which drives the light source apparatus 31. That is, the first cooling target is the light source apparatus 31.

The amount of heat generated by the light source apparatus 31 is generally greater than the amount of heat generated by the light source drive circuit 72. The configuration described above, in which the first heat dissipation member 312 is the first cooling target and the light source drive circuit 72 is the second cooling target, can therefore increase the efficiency at which the first heat dissipation member 312 is cooled, and can in turn increase the efficiency at which the light source apparatus 31 and the light source drive circuit 72 are each cooled.

The light source apparatus 31 and the light source drive circuit 72 are disposed close to each other in many cases. The cooling air FW3 sent from the third fan 55 can therefore be readily caused to flow to the first heat dissipation member 312 and the light source drive circuit 72 disposed at positions close to each other.

The projector 1 includes the power supply apparatus 9 as a third cooling target. The exterior housing 2 includes the accommodation chamber 28, which accommodates the power supply apparatus 9, inside the exterior housing 2. The third fan 55 sucks the air outside the exterior housing 2 via the openings 2672 and 2673 of the third intake ports 267, and further sucks the gas in the accommodation chamber 28.

According to the configuration described above, the first heat dissipation member 312, the light source drive circuit 72, and the power supply apparatus 9 can each be cooled by the third fan 55. Therefore, the number of fans can be reduced as compared with the case where a cooling fan is provided on a cooling target basis, so that the size of the projector 1 can be reduced, and the manufacturing cost of the projector 1 can be reduced.

In the projector 1, the third cooling target, which is disposed in the accommodation chamber 28 and through which the cooling air FW2 is caused to flow by the third fan 55, is the power supply apparatus 9.

According to the configuration described above, the power supply apparatus 9 can be effectively cooled.

The projector 1 includes the duct member 57, which constitutes the third duct 56. The duct member 57 corresponds to the separation member. The duct member 57 separates the space which extends from the plurality of fins 3121 to the discharge ports 242 and through which the cooling air FW31, which is part of the cooling air FW3 sent from the third fan 55, flows from the space which extends from the light source drive circuit 72 to the discharge ports 242 and through which the cooling air FW32, which is part of the cooling air FW3 sent from the third fan 55, flows.

According to the configuration described above, the spaces are separated from each other by the duct member 57, so that the cooling airflows FW31 and FW32 can efficiently flow through the respective spaces. The efficiency at which the first heat dissipation member 312 and the light source drive circuit 72 are each cooled can therefore be increased.

In the projector 1, out of the plurality of openings 2421, which constitute the discharge ports 242, the first opening 2422, via which the cooling air FW31 having passed through the plurality of fins 3121 is discharged with the aid of the delivery force produced by the third fan 55, and the second opening 2423, via which the cooling air FW32 is discharged by the positive pressure in the exterior housing 2, are disposed adjacent to each other.

According to the configuration described above, the cooling air FW31 is discharged via the first opening 2422 at a relatively high discharge speed, so that the cooling air FW32 exhausted via the second opening 2423 can be attracted by the cooling air FW31 exhausted via the first opening 2422. The cooling air exhausted via the first opening 2422 can therefore assist the cooling air exhausted via the second opening 2423, the efficiency at which the light source drive circuit 72 cooled by the cooling air FW32 discharged via the second opening 2423 is cooled can be further increased.

The projector 1 includes the image formation unit 35, which includes the light modulators 352, which modulate the light incident thereon, and forms image light. The image formation unit 35 is disposed in the exterior housing 2, and the second fan 54 sends cooling air to the image formation unit 35.

According to the configuration described above, the image formation unit 35, which is a heat source, can be cooled by the cooling air, and the cooling air having cooled the image formation unit 35 is diffused inside the exterior housing 2, so that the pressure in the exterior housing 2 can be further increased.

Variations of Embodiments

The present disclosure is not limited to the embodiment described above, and variations, improvements, and other modifications to the extent that the advantage of the present disclosure is achieved fall within the scope of the present disclosure.

It is assumed in the embodiment described above that the control substrate 7 extends to the wireless communication apparatus 4. That is, the control substrate 7 is disposed so as not to interfere with the wireless communication apparatus 4, but not necessarily. The control substrate 7 may be disposed at a position shifted from the wireless communication apparatus 4 toward the positive Y direction. Furthermore, the wireless communication apparatus 4 may be disposed at a position different from the position described above, or the wireless communication apparatus 4 may be omitted.

In any of the cases described above, the control substrate 7 can be extended to the rear surface 22, and the discharge ports through which the cooling air FW32 on which the positive pressure acts is discharged can be disposed at the rear surface 22. Since the positive pressure acts on the cooling air FW32, the surface of the exterior housing 2 at which the discharge ports through which the cooling air FW32 is discharged are disposed may not be the same as the surface at which the discharge ports through which the cooling air FW31 is discharged are disposed. The discharge ports via which the cooling air FW31 is discharged and the discharge ports via which the cooling air FW32 is discharged may be disposed at different surfaces of the exterior housing 2, for example, may be disposed at surfaces that intersect with each other. In this case, in the exterior housing 2, a first surface at which the discharge ports through which the cooling air FW31 is discharged are disposed may be a surface different from the left side surface 24, and a second surface at which the discharge ports through which the cooling air FW32 is discharged are disposed may be a surface different from the rear surface 22.

When the discharge ports via which the cooling air FW31 is discharged are called first discharge ports, and the discharge ports via which the cooling air FW32 is discharged are called second discharge ports, the projector 1 includes the exterior housing 2 having the first surface having the first discharge ports and the second surface having the second discharge ports, the first heat dissipation member 312, the light source drive circuit 72, the third fan 55, and the second fan 54.

The first heat dissipation member 312 corresponds to the first cooling target, and includes the plurality of fins 3121.

The light source drive circuit 72 corresponds to the second cooling target, and is juxtaposed with the first heat dissipation member 312.

The third fan 55 corresponds to a first cooling fan. The third fan 55 sucks the air outside the exterior housing 2 via the third intake ports 267, and sends the sucked outside air as the cooling air FW3 to each of the first heat dissipation member 312 and the light source drive circuit 72. The cooling air sent by the third fan 55 corresponds to first cooling air.

The second fan 54 corresponds to the second cooling fan. The second fan 54 sucks the air outside the exterior housing 2 via the second intake ports 266, sends the sucked outside air as cooling air into the exterior housing 2 to create the positive pressure in the space S1 in the exterior housing 2. The cooling air sent by the second fan 54 corresponds to second cooling air.

The plurality of fins 3121 constitute part of the flow path through which the cooling air FW31, which is part of the cooling air FW3, flows between the plurality of fins 3121.

The first discharge ports disposed at the first surface are disposed at positions where the first discharge ports oppose the plurality of fins 3121 at a position downstream from the plurality of fins 3121 in the flow path through which the cooling air FW31 flows.

The light source drive circuit 72 is disposed in the space S1, where the positive pressure is created inside the exterior housing 2.

The cooling air FW31 sent from the third fan 55 and flowing between the plurality of fins 3121 of the first heat dissipation member 312 flows to the first discharge ports with the aid of the delivery force produced by the third fan 55.

The cooling air FW32 flowing from the third fan 55 to the light source drive circuit 72 flows to the second discharge ports disposed at the second surface with the positive pressure in the exterior housing 2 acting on the cooling air FW32.

The thus configured projector 1 provides the same advantageous effects as those provided by the projector 1 according to the embodiment described above.

That is, out of the first heat dissipation member 312 and the light source drive circuit 72, the first heat dissipation member 312 is cooled by the cooling air FW31 flowing between the plurality of fins 3121 and discharged via the first discharge ports at the first surface, and the light source drive circuit 72 is cooled by the cooling air FW32 sent from the third fan 55 and discharged via the second discharge ports at the second surface with the positive pressure in the exterior housing 2 acting on the cooling air FW32. The first heat dissipation member 312 can therefore be effectively cooled by the cooling air FW31 discharged via the first discharge ports with the aid of the delivery force produced by the third fan 55, and the cooling air FW31 having cooled the first heat dissipation member 312 can be quickly discharged. Furthermore, the light source drive circuit 72 can be effectively cooled by the cooling air FW32 discharged via the second discharge ports with the positive pressure in the exterior housing 2 acting on the cooling air FW32, and the cooling air FW32 having cooled the light source drive circuit 72 can be quickly discharged. The efficiency at which the first heat dissipation member 312 and the light source drive circuit 72 are each cooled can therefore be increased, so that the size of the projector 1 can be reduced, and the noise due to the fans can be reduced, as compared with a case where a cooling fan that cools the first heat dissipation member 312 and a cooling fan that cools the light source drive circuit 72 are separately provided.

The thus configured projector 1 may include a separation member that separates a first space which extends from the plurality of fins 3121 to the first discharge ports and through which the cooling air FW31 flows from a second space which extends from the light source drive circuit 72 to the discharge ports 242 and through which the cooling air FW32 flows. For example, the thus configured separation member may have the same configuration as that of the duct member 57 described above.

When the second surface at which the second discharge ports are disposed is oriented so as to intersect with the first surface at which the first discharge ports are disposed, the first space through which the cooling air FW31 flows may oppose the first surface, and the second space through which the cooling air FW32 flows may be shifted from the first space toward the second surface and oppose the first and second surfaces.

In this case, since the first and second spaces can be arranged close to the first and second surfaces, respectively, the discharge ports can be disposed at each of the first and second surfaces, so that the discharge ports can be disposed with improved flexibility with the size of the projector 1 reduced.

It is assumed in the embodiment described above that the first cooling target is the first heat dissipation member 312, which dissipates the heat of the light source 311 of the light source apparatus 31, but not necessarily. The first cooling target may be a heat dissipation member that dissipates heat of another component of the light source apparatus 31. For example, the first cooling target may be the second heat dissipation member 317. The first cooling target may be the light source housing CA as long as it dissipates the heat of the light source apparatus 31. Furthermore, the first cooling target may be an object that dissipates heat of a component other than the light source apparatus 31, or may be a heat source itself.

It is assumed in the embodiment described above that the second cooling target is the light source drive circuit 72, which drives the light source apparatus 31, but not necessarily. The second cooling target may be a heat source or a heat dissipation member.

It is assumed in the embodiment described above that the cooling air FW32, out of the cooling air FW3 sent from the third fan 55 as the first cooling fan, is caused to flow through the flow port 571 of the duct member 57 to divide the cooling air FW3 into the cooling air FW31 flowing to the first cooling target and the cooling air FW32 flowing to the second cooling target, but not necessarily. Another flow dividing mechanism may be used to divide the cooling air sent from the third fan 55.

It is assumed in the embodiment described above that the amount of heat generated by the first cooling target is greater than the amount of heat generated by the second cooling target, and the positive pressure in the exterior housing 2 acts on the cooling air FW32 flowing through the second cooling target and discharged via the discharge ports 242, but not necessarily. The amount of heat generated by the first cooling target may be equal to the amount of heat generated by the second cooling target through which the cooling air on which the positive pressure in the exterior housing acts flows, or may be smaller than the amount of heat generated by the second cooling target.

It is assumed in the embodiment described above that the third fan 55 as the first cooling fan directly sucks the outside air via the opening sections 2672 and 2673 of the third intake ports 267, and sucks the outside air flowing through the accommodation chamber 28, in which the power supply apparatus 9, which is the third cooling target, is disposed via the opening sections 2671, but not necessarily. The third cooling target may be a component other than the power supply apparatus 9, and the third cooling target may not be provided.

It is assumed in the embodiment described above that the duct member 57 separates the space which extends from the plurality of fins 3121 of the first heat dissipation member 312 to the discharge ports 242 and through which the cooling air FW31, which is part of the cooling air FW3 sent from the third fan 55, flows from the space which extends from the light source drive circuit 72 to the discharge ports 242 and through which the cooling air FW32, which is the remainder of the cooling air FW3 sent from the third fan 55, flows, but not necessarily. The duct member 57, which separates the spaces from each other, may be omitted, and the spaces may be separated from each other by another component.

It is assumed in the embodiment described above that out of the plurality of openings 2421, which constitute the discharge ports 242, the first opening 2422, through which the cooling air FW31 is discharged, and the second opening 2423, through which the cooling air FW32 on which the positive pressure acts on is discharged, are disposed adjacent to each other, but not necessarily. The first opening 2422 and the second opening 2423 may be separate from each other. For example, the discharge port via which the cooling air FW31 is discharged may differ from the discharge port via which the cooling air FW32 is discharged.

It is assumed in the embodiment described above that the second fan 54 as the second cooling fan creates the positive pressure in the space S1 in the exterior housing 2 while sending the cooling air to the image formation unit 35, but not necessarily. The cooling target to which the cooling air is sent from the second fan 54 may be another component, and the cooling target cooled by the cooling air from the second fan 54 may not be provided. That is, the second cooling fan may be used for any other purpose as long as the second cooling fan creates a positive pressure in the exterior housing.

It is assumed in the embodiment described above that the porous member 85 provided in the speaker unit 8 is provided at the entrance-side port of the bass reflex duct BR, but not necessarily. The porous member 85 may be provided at the exit-side port of the bass reflex duct BR. That is, the porous member 85 may be provided outside the speaker housing 81.

When the porous member 85 is provided at the entrance-side port, the porous member 85 is not exposed to the space outside the speaker housing 81, so that the assembly of the speaker unit 8 into the exterior housing 2 can be simplified.

It is assumed in the embodiment described above that the projector 1 includes the three light modulators 352R, 352G, and 352B, but not necessarily. The contents of the present disclosure are also applicable to a projector including two or fewer or four or greater number of light modulators.

In the embodiment described above, the image projection apparatus 3 is formed in a substantially L shape when viewed from the side facing the positive Y direction, as shown in FIG. 4, but not necessarily. The configuration and the layout of the image projection apparatus 3 are not limited to those described above, and the image projection apparatus 3 may be formed, for example, in a substantially U shape.

It is assumed in the embodiment described above that the light modulators 352 each include a transmissive liquid crystal panel having a light incident surface and a light exiting surface different from each other, but not necessarily. The light modulators may each be a reflective liquid crystal panel having a surface that serves both as the light incident surface and the light exiting surface. Furthermore, a light modulator using any component other than a liquid-crystal-based component, such as a device using micromirrors, for example, a digital micromirror device (DMD), may be employed as long as the component is capable of modulating an incident luminous flux to form an image according to image information.

Summary of Present Disclosure

The present disclosure will be summarized below as additional remarks.

Additional Remark 1

A projector including an exterior housing having a discharge port having a plurality of openings, a first cooling target including a plurality of fins, a second cooling target, a first cooling fan that sucks the air outside the exterior housing and sends the sucked outside air as first cooling air to each of the first cooling target and the second cooling target, and a second cooling fan that sucks the air outside the exterior housing, and sends the sucked outside air as second cooling air into the exterior housing to create a positive pressure in the exterior housing, in which the plurality of fins constitute part of a flow path through which the first cooling air flows between the plurality of fins, at least one of the plurality of openings is disposed at a position where the one opening opposes the plurality of fins at a position downstream from the plurality of fins in the flow path through which the first cooling air flows, the second cooling target is disposed at a position where the positive pressure is created inside the exterior housing, the first cooling air sent from the first cooling fan and flowing between the plurality of fins flows to the at least one opening with the aid of the delivery force produced by the first cooling fan, and the first cooling air sent from the first cooling fan and flowing to the second cooling target flows to any of the plurality of openings with the positive pressure in the exterior housing acting on the first cooling air.

According to the configuration described above, out of the first cooling target and the second cooling target, the first cooling target is cooled by the first cooling air flowing between the plurality of fins and discharged via the discharge port, and the second cooling target is cooled by the first cooling air sent from the first cooling fan and discharged via the discharge port with the positive pressure in the exterior housing acting on the first cooling air. The first cooling target can therefore be effectively cooled by the first cooling air discharged via the discharge port with the aid of the delivery force produced by the first cooling fan, and the first cooling air having cooled the first cooling target can be quickly discharged. Furthermore, the second cooling target can be effectively cooled by the first cooling air discharged via the discharge port with the positive pressure in the exterior housing acting on the first cooling air, and the first cooling air having cooled the second cooling target can be quickly discharged. The efficiency at which the cooling targets are each cooled can therefore be increased, so that the size of the projector can be reduced, and the noise due to the cooling fan can be reduced as compared with a case where a cooling fan that cools the first cooling target and a cooling fan that cools the second cooling target are separately provided.

Additional Remark 2

The projector described in the additional remark 1, in which the amount of heat generated by the first cooling target is greater than the amount of heat generated by the second cooling target.

According to the configuration described above, the first cooling air from the first cooling fan flows through the first cooling target without the first cooling air stagnating, the first cooling target, which generates an amount of heat greater than the amount of heat generated by the second cooling target, can be effectively cooled by the first cooling air. In addition, since the first cooling target includes the plurality of fins, the efficiency at which the heat of the first cooling target is dissipated is higher than the efficiency at which the heat of the second cooling target is dissipated. The first cooling target can therefore be effectively cooled by the first cooling air.

Additional Remark 3

The projector described in the additional remark 2, in which the first cooling target is a heat dissipation member that dissipates heat of a light source apparatus that outputs light, and the second cooling target is a light source drive circuit that drives the light source apparatus.

Since the amount of heat generated by a light source apparatus is generally greater than the amount of heat generated by a light source drive circuit, the configuration described above, in which the first cooling target is the heat dissipation member and the second cooling target is the light source drive apparatus, can increase the efficiency at which the heat dissipation member is cooled, and can in turn increase the efficiency at which the light source apparatus and the light source drive circuit are each cooled.

The light source apparatus and the light source drive circuit are disposed close to each other in many cases. The first cooling air sent from the first cooling fan can therefore be readily caused to flow to the heat dissipation member and the light source drive circuit disposed at positions close to each other.

Additional Remark 4

The projector described in any one of the additional remarks 1 to 3, further including a third cooling target, in which the exterior housing includes an accommodation chamber that accommodates the third cooling target inside the exterior housing, and the first cooling fan sucks the air outside the exterior housing and the gas in the accommodation chamber.

According to the configuration described above, the first cooling fan can cool each of the first, second, and third cooling targets. Therefore, the number of cooling fans can be reduced as compared with the case where a cooling fan is provided on a cooling target basis, so that the size of the projector can be reduced, and the manufacturing cost of the projector can be reduced.

Additional Remark 5

The projector described in the additional remark 4, in which the third cooling target is a power supply apparatus.

According to the configuration described above, the power supply apparatus, which is the third cooling target, can be effectively cooled.

Additional Remark 6

The projector described in any one of the additional remarks 1 to 5, further including a separation member that separates the space which extends from the plurality of fins to the discharge port and through which part of the first cooling air sent from the first cooling fan flows from the space which extends from the second cooling target to the discharge port and through which the remainder of the first cooling air sent from the first cooling fan flows.

According to the configuration described above, in which the separation member separates the spaces from each other, the first cooling air efficiently flows through the spaces, so that the efficiency at which the first and second cooling targets are each cooled can be increased.

Additional Remark 7

The projector described in any one of the additional remarks 1 to 6, in which out of the plurality of openings, a first opening via which the first cooling air having passed through the plurality of fins is discharged with the aid of the delivery force produced by the first cooling fan, and a second opening via which the first cooling air is discharged by the positive pressure in the exterior housing are disposed adjacent to each other.

According to the configuration described above, the first cooling air is discharged via the first opening at a relatively high discharge speed, so that the first cooling air exhausted via the second opening can be attracted by the first cooling air exhausted via the first opening. The cooling air exhausted via the first opening can therefore assist the cooling air exhausted via the second opening, the efficiency at which the second cooling target cooled by the first cooling air discharged via the second opening is cooled can be further increased.

Additional Remark 8

A projector including an exterior housing having a first surface having a first discharge port and a second surface having a second discharge port, a first cooling target including a plurality of fins, a second cooling target, a first cooling fan that sucks the air outside the exterior housing and sends the sucked outside air as first cooling air to each of the first cooling target and the second cooling target, and a second cooling fan that sucks the air outside the exterior housing, and sends the sucked outside air as second cooling air into the exterior housing to create a positive pressure in the exterior housing, the plurality of fins constitute part of a flow path through which the first cooling air flows between the plurality of fins, the first discharge port is disposed at a position where the first discharge port opposes the plurality of fins at a position downstream from the plurality of fins in the flow path through which the first cooling air flows, the second cooling target is disposed at a position where the positive pressure is created inside the exterior housing, the first cooling air sent from the first cooling fan and flowing between the plurality of fins flows to the first discharge port with the aid of the delivery force produced by the first cooling fan, and the first cooling air sent from the first cooling fan and flowing to the second cooling target flows to the second discharge port with the positive pressure in the exterior housing acting on the first cooling air.

According to the configuration described above, out of the first cooling target and the second cooling target, the first cooling target is cooled by the first cooling air flowing between the plurality of fins and discharged via the first discharge port at the first surface, and the second cooling target is cooled by the first cooling air sent from the first cooling fan and discharged via the second discharge port at the second surface with the positive pressure in the exterior housing acting on the first cooling air. The first cooling target can therefore be effectively cooled by the first cooling air discharged via the first discharge port with the aid of the delivery force produced by the first cooling fan, and the first cooling air having cooled the first cooling target can be quickly discharged. Furthermore, the second cooling target can be effectively cooled by the first cooling air discharged via the second discharge port with the positive pressure in the exterior housing acting on the first cooling air, and the first cooling air having cooled the second cooling target can be quickly discharged. The efficiency at which the cooling targets are each cooled can therefore be increased, so that the size of the projector can be reduced, and the noise due to the cooling fan can be reduced as compared with a case where a cooling fan that cools the first cooling target and a cooling fan that cools the second cooling target are separately provided.

Additional Remark 9

The projector described in the additional remark 8, further including a separation member that separates a first space which extends from the plurality of fins to the first discharge port and through which part of the first cooling air sent from the first cooling fan flows from a second space which extends from the second cooling target to the second discharge port and through which the remainder of the first cooling air sent from the first cooling fan flows.

According to the configuration described above, in which the separation member separates the spaces from each other, the first cooling air efficiently flows through the spaces, so that the efficiency at which the first and second cooling targets are each cooled can be increased.

Additional Remark 10

The projector described in the additional remark 9, in which the second surface is oriented so as to intersect with the first surface, the first space opposes the first surface, and the second space is shifted from the first space toward the second surface and opposes the first and second surfaces.

According to the configuration described above, since the first and second spaces can be arranged close to the first and second surfaces, respectively, the discharge port can be disposed at each of the first and second surfaces, so that the discharge port can be disposed with improved flexibility with the size of the projector reduced.

Additional Remark 11

The projector described in any one of the additional remarks 8 to 10, in which the first cooling target is a heat dissipation member that dissipates heat of a light source apparatus that outputs light, and the second cooling target is a light source drive circuit that drives the light source apparatus.

Since the amount of heat generated by a light source apparatus is generally greater than the amount of heat generated by a light source drive circuit, the configuration described above, in which the first cooling target is the heat dissipation member and the second cooling target is the light source drive apparatus, can increase the efficiency at which the heat dissipation member is cooled, and can in turn increase the efficiency at which the light source apparatus and the light source drive circuit are each cooled.

The light source apparatus and the light source drive circuit are disposed close to each other in many cases. The first cooling air sent from the first cooling fan can therefore be readily caused to flow to the heat dissipation member and the light source drive circuit disposed at positions close to each other.

Additional Remark 12

The projector described in any one of the additional remarks 1 to 11, further including an image formation unit including a light modulator that modulates light incident thereon and forms image light, in which the image formation unit is disposed in the exterior housing, and the second cooling fan sends the second cooling air to the image formation unit.

According to the configuration described above, the image formation unit, which is a heat source, can be cooled by the second cooling air, and the second cooling air having cooled the image formation unit is diffused inside the exterior housing, so that the pressure inside the exterior housing can be further increased.

What is claimed is:

1. A projector comprising:

an exterior housing having a discharge port having a plurality of openings;

a first cooling target including a plurality of fins;

a second cooling target;

a first cooling fan that sucks air outside the exterior housing and sends the sucked outside air as first cooling air to each of the first cooling target and the second cooling target; and a second cooling fan that sucks the air outside the exterior housing and sends the sucked outside air as second cooling air into the exterior housing to create a positive pressure in the exterior housing, wherein the plurality of fins constitute part of a flow path through which the first cooling air flows between the plurality of fins, at least one of the plurality of openings is disposed at a position where the one opening opposes the plurality of fins at a position downstream from the plurality of fins in the flow path through which the first cooling air flows, the second cooling target is disposed at a position where the positive pressure is created inside the exterior housing, the first cooling air sent from the first cooling fan and flowing between the plurality of fins flows to the at least one opening with the aid of a delivery force produced by the first cooling fan, and the first cooling air sent from the first cooling fan and flowing to the second cooling target flows to one of the plurality of openings with the positive pressure in the exterior housing acting on the first cooling air.

2. The projector according to claim 1, wherein an amount of heat generated by the first cooling target is greater than an amount of heat generated by the second cooling target.

3. The projector according to claim 2, wherein the first cooling target is a heat dissipation member that dissipates heat of a light source apparatus that outputs light, and the second cooling target is a light source drive circuit that drives the light source apparatus.

4. The projector according to claim 1, further comprising a third cooling target, wherein the exterior housing includes an accommodation chamber that accommodates the third cooling target inside the exterior housing, and the first cooling fan sucks the air outside the exterior housing and a gas in the accommodation chamber.

5. The projector according to claim 4, wherein the third cooling target is a power supply apparatus.

6. The projector according to claim 1, further comprising a separation member that separates a space which extends from the plurality of fins to the discharge port and through which part of the first cooling air sent from the first cooling fan flows from a space which extends from the second cooling target to the discharge port and through which another part of the first cooling air sent from the first cooling fan flows.

7. The projector according to claim 1, wherein out of the plurality of openings, a first opening via which the first cooling air passing through the plurality of fins is discharged with the aid of the delivery force produced by the first cooling fan, and a second opening via which the first cooling air is discharged by the positive pressure in the exterior housing are disposed adjacent to each other.

8. The projector according to claim 1, further comprising an image formation unit including a light modulator that modulates light incident thereon and forms image light, wherein the image formation unit is disposed in the exterior housing, and the second cooling fan sends the second cooling air to the image formation unit.

9. A projector comprising:

an exterior housing having a first surface having a first discharge port and a second surface having a second discharge port;

a first cooling target including a plurality of fins;

a second cooling target;

a first cooling fan that sucks air outside the exterior housing and sends the sucked outside air as first cooling air to each of the first cooling target and the second cooling target; and a second cooling fan that sucks the air outside the exterior housing, and sends the sucked outside air as second cooling air into the exterior housing to create a positive pressure in the exterior housing, wherein the plurality of fins constitute part of a flow path through which the first cooling air flows between the plurality of fins, the first discharge port is disposed at a position where the first discharge port opposes the plurality of fins at a position downstream from the plurality of fins in the flow path through which the first cooling air flows, the second cooling target is disposed at a position where the positive pressure is created inside the exterior housing, the first cooling air sent from the first cooling fan and flowing between the plurality of fins flows to the first discharge port with the aid of a delivery force produced by the first cooling fan, and the first cooling air sent from the first cooling fan and flowing to the second cooling target flows to the second discharge port with the positive pressure in the exterior housing acting on the first cooling air.

10. The projector according to claim 9, further comprising a separation member that separates a first space which extends from the plurality of fins to the first discharge port and through which part of the first cooling air sent from the first cooling fan flows from a second space which extends from the second cooling target to the second discharge port and through which another part of the first cooling air sent from the first cooling fan flows.

11. The projector according to claim 10, wherein the second surface intersects with the first surface, the first space opposes the first surface, and the second space is shifted from the first space toward the second surface and opposes the first and second surfaces.

12. The projector according to claim 9, wherein the first cooling target is a heat dissipation member that dissipates heat of a light source apparatus that outputs light, and the second cooling target is a light source drive circuit that drives the light source apparatus.

13. The projector according to claim 9, further comprising an image formation unit including a light modulator that modulates light incident thereon and forms image light, wherein the image formation unit is disposed in the exterior housing, and the second cooling fan sends the second cooling air to the image formation unit.

* * * * *